(12) United States Patent
Young

(10) Patent No.: US 11,472,555 B2
(45) Date of Patent: Oct. 18, 2022

(54) AFT WALL FOR A LAVATORY MONUMENT OF AN AIRCRAFT

(71) Applicant: The Boeing Company, Chicago, IL (US)

(72) Inventor: Stephen M. Young, Los Alamitos, CA (US)

(73) Assignee: The Boeing Company, Chicago, IL (US)

( * ) Notice: Subject to any disclaimer, the term of this patent is extended or adjusted under 35 U.S.C. 154(b) by 781 days.

(21) Appl. No.: 16/172,429

(22) Filed: Oct. 26, 2018

(65) Prior Publication Data

US 2020/0130843 A1 Apr. 30, 2020

(51) Int. Cl.
| | | |
|---|---|---|
| *B64D 11/02* | (2006.01) | |
| *B64D 11/04* | (2006.01) | |
| *B64D 11/06* | (2006.01) | |

(52) U.S. Cl.
CPC .............. *B64D 11/02* (2013.01); *B64D 11/04* (2013.01); *B64D 11/0691* (2014.12); *B64D 11/0698* (2014.12)

(58) Field of Classification Search
CPC ..... B64D 11/02; B64D 11/04; B64D 11/0023; B64D 2011/0046; E04B 2002/0265; E04B 2002/0263; E04B 2/12; E04C 2/30; B60R 15/02; B60R 15/04; A47B 95/043; A47B 2095/046
See application file for complete search history.

(56) References Cited

U.S. PATENT DOCUMENTS

| | | | | | |
|---|---|---|---|---|---|
| 3,192,671 | A | * | 7/1965 | Smith ....................... | E04B 1/14 52/434 |
| 4,227,355 | A | * | 10/1980 | Wendt ....................... | E04B 1/86 160/196.1 |
| 4,949,929 | A | * | 8/1990 | Kesselman ............ | A47B 96/06 248/220.1 |
| 5,082,224 | A | * | 1/1992 | Hayward ........... | B64D 11/0023 160/135 |
| 6,079,669 | A | * | 6/2000 | Hanay ................... | B64D 11/02 244/118.5 |
| 8,944,377 | B2 | | 2/2015 | McIntosh | |
| 9,145,697 | B1 | * | 9/2015 | Avery, III ............... | E04B 2/828 |
| 9,321,533 | B2 | * | 4/2016 | Cuddy .................... | B64D 11/04 |
| 9,896,212 | B2 | * | 2/2018 | Savian ................... | B64D 11/04 |
| 10,124,743 | B2 | * | 11/2018 | Talebpour ............. | F16B 5/0685 |
| 10,518,862 | B2 | * | 12/2019 | Burd ........................ | F16B 9/02 |
| 10,556,686 | B2 | * | 2/2020 | Heidtmann ............ | B64D 11/02 |
| 10,829,195 | B2 | * | 11/2020 | Bobaru ..................... | B64C 1/10 |
| 2009/0294586 | A1 | * | 12/2009 | Brown .................. | B64D 11/04 244/118.5 |

(Continued)

FOREIGN PATENT DOCUMENTS

WO 2016162918 A1 10/2016

OTHER PUBLICATIONS

Extended European Search Report, dated Jan. 23, 2020, regarding Application No. 19205433.6, 9 pages.

*Primary Examiner* — Peter M Poon
*Assistant Examiner* — Marisa V Conlon
(74) *Attorney, Agent, or Firm* — Yee & Associates, P.C.

(57) ABSTRACT

An aircraft comprises a fuselage and an aft wall of a lavatory monument within the fuselage and extending radially inwardly relative to the fuselage. The aft wall is removably connected to an outboard wall, a ceiling, and a floor of the lavatory monument.

24 Claims, 19 Drawing Sheets

(56) References Cited

U.S. PATENT DOCUMENTS

2015/0284085 A1 10/2015 McKee et al.
2016/0122021 A1 5/2016 Savian et al.
2017/0021929 A1 1/2017 McKee et al.

* cited by examiner

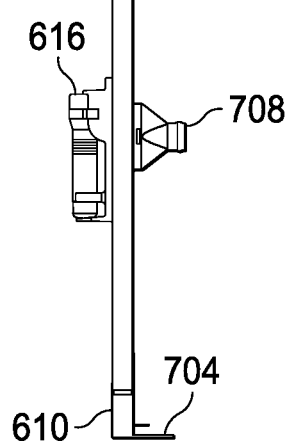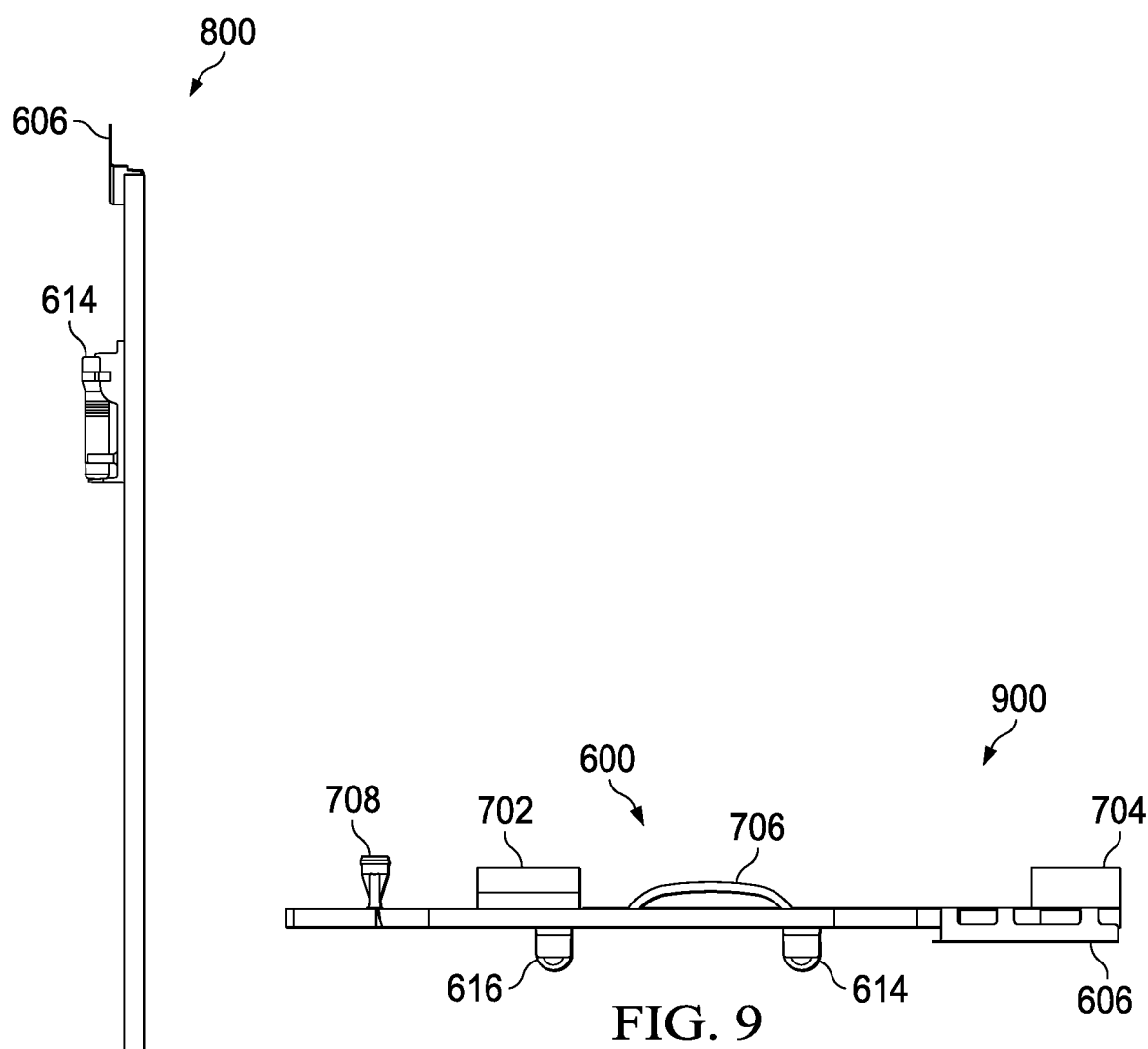

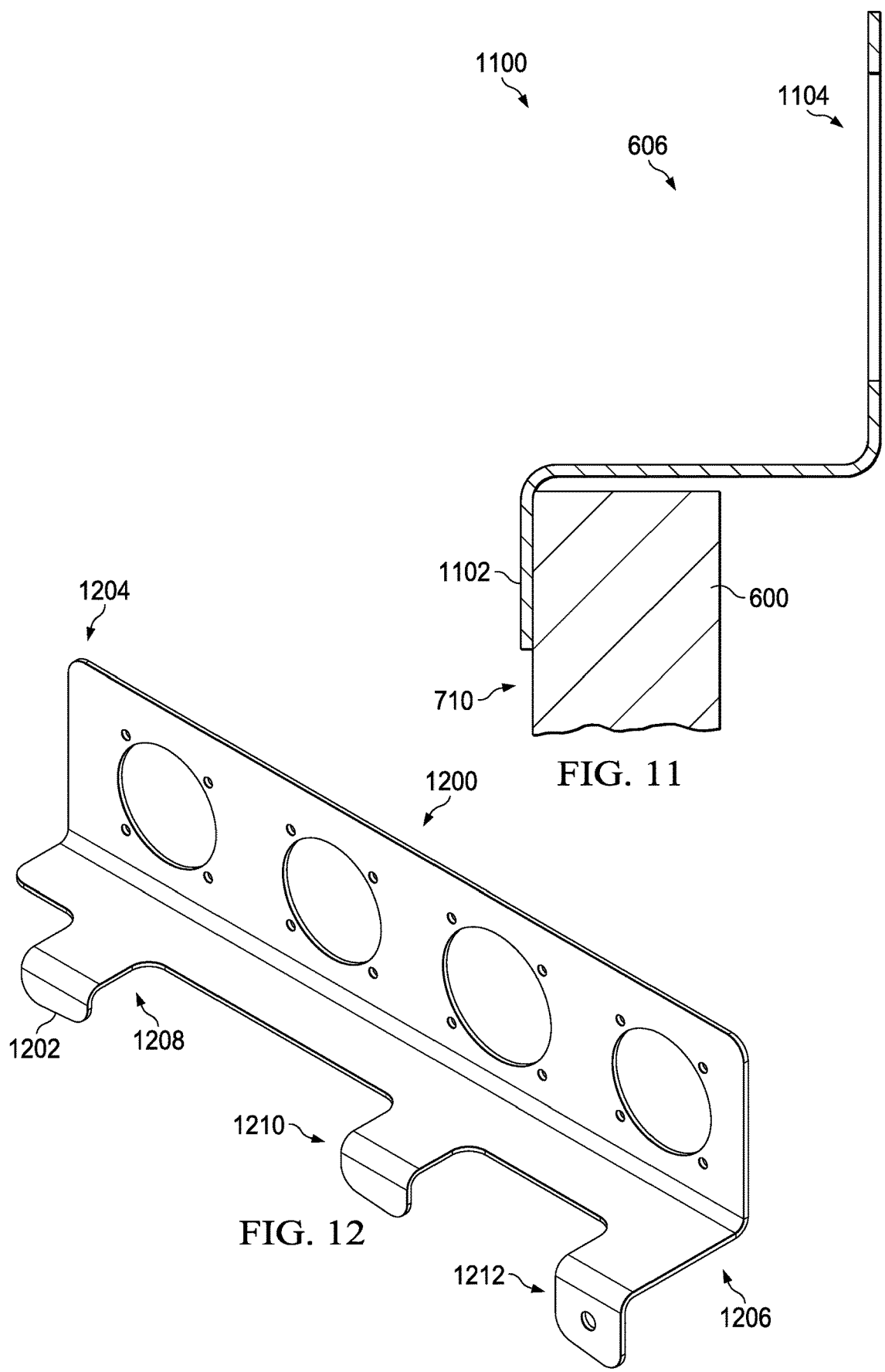

AFT WALL FOR A LAVATORY MONUMENT OF AN AIRCRAFT

CROSS-REFERENCE TO RELATED APPLICATIONS

This application is related to U.S. Patent Application No. 16,172,327, filed concurrently with this application, and titled "Improved Lavatory Monument for Aircraft", this application is related to U.S. patent application Ser. No. 16,172,247, filed concurrently with this application, and titled "Modular Faucet System for Aircraft", now U.S. Pat. No. 10,994,844, issued May 4, 2021; the entire disclosures of which are incorporated by reference herein.

BACKGROUND INFORMATION

1. Field

The present disclosure relates generally to lavatory monuments on aircraft and more particularly to an aft wall having replaceable fixtures for a lavatory monument of an aircraft.

2. Background

Aircraft are subject to strict regulatory compliance standards in nearly every country in the world. In the United States, the Federal Aviation Administration governs the standards for manufacturing, maintaining, and operating aircraft and ancillary concerns such as operating airports. The Federal Aviation Regulations (FARs) are organized into sections known as parts due to the organization within the Code of Federal Regulations. There are dozens of parts divided into tens of thousands of separate sections, many of which have large numbers of researchers and technicians using them at any given time. In all, there are many thousands of pages of regulations that must be observed across the aircraft industry.

Of the FARs, part 21 deals with certification procedures for products and parts. These FARs also interact with other regulations, such as but not limited to parts 23-39 (dealing with airworthiness standards for different types of aircraft), part 43 (maintenance), part 119 (certification of carriers), part 121 (operating requirements), part 125 (large passenger aircraft), and others.

Because of these extensive regulations, a technician or engineer cannot simply replace a part with something he or she sees in non-aircraft markets. Instead, new or replacement parts must either be pre-approved per regulations, or approval must be obtained from the Federal Aviation Administration (or other regulatory body in countries other than the United States) in order to use new or different parts.

For example, aircraft lavatories, like any other parts of the aircraft, are subject to strict regulatory requirements. A great many design features are required, right down to the height at which fluid lines are placed in the lavatory. Because of these regulations, aircraft lavatories for commercial aircraft have traditionally been constructed as whole units, known as "monuments". More generally, a "monument" is a large, replaceable section of an inside of the aircraft designed for a purpose, such as but not limited to a lavatory. The monument design scheme allows, for example, a lavatory for a commercial aircraft to be approved by regulators as a whole and then installed in an aircraft.

However, this regulatory and design scheme results in a problem: if even a single component of the inside of the lavatory requires replacement, such as if a merely decorative flaw were to appear in a backsplash, then the entire lavatory monument (walls, floor, toilet, sink, everything) has to be removed and a new lavatory monument installed. It is not possible to simply remove and replace the backsplash. This problem is not easily solved because the heavy regulatory environment leads engineers to design entire lavatory monuments to meet regulatory requirements. To date, no solution to this problem has been presented. Instead, carriers and manufacturers have had to bear the cost of replacing entire lavatory monuments for even minor adjustments or corrections to a lavatory.

SUMMARY

An illustrative embodiment of the present disclosure provides an aircraft. The aircraft comprises a fuselage and an aft wall of a lavatory monument within the fuselage and extending radially inwardly relative to the fuselage. The aft wall is removably connected to an outboard wall, a ceiling, and a floor of the lavatory monument.

Another illustrative embodiment of the present disclosure provides an aft wall configured to be removably connected to an outboard wall, a ceiling, and a floor of a lavatory monument. The aft wall comprises a curved outboard edge having a common curvature, a metal bracket bonded to the curved outboard edge. The metal bracket is configured to removably connect the aft wall to the outboard wall.

Yet another illustrative embodiment of the present disclosure provides a method of constructing a lavatory monument in an aircraft, the lavatory monument having interchangeable sub-assemblies. A metal bracket is bonded to a curved outboard edge of an aft wall. The metal bracket is joined to an outboard wall of the lavatory monument using a plurality of fasteners. The aft wall is removably connected to a ceiling and a floor of the lavatory monument.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of an inboard edge of an aft wall configured to be joined to a modular door of a lavatory monument in accordance with an illustrative embodiment;

FIG. 9 is an illustration of a top view of a curved outboard edge of an aft wall configured to be joined to an outboard wall of a lavatory monument in accordance with an illustrative embodiment;

FIG. 11 is an illustration of a cross-sectional view of a metal bracket bonded to a curved outboard edge of an aft wall configured to be joined to an outboard wall of a lavatory monument in accordance with an illustrative embodiment;

FIG. 12 is an illustration of a perspective view of a front of a metal bracket in accordance with an illustrative embodiment;

DETAILED DESCRIPTION

Figure 1:
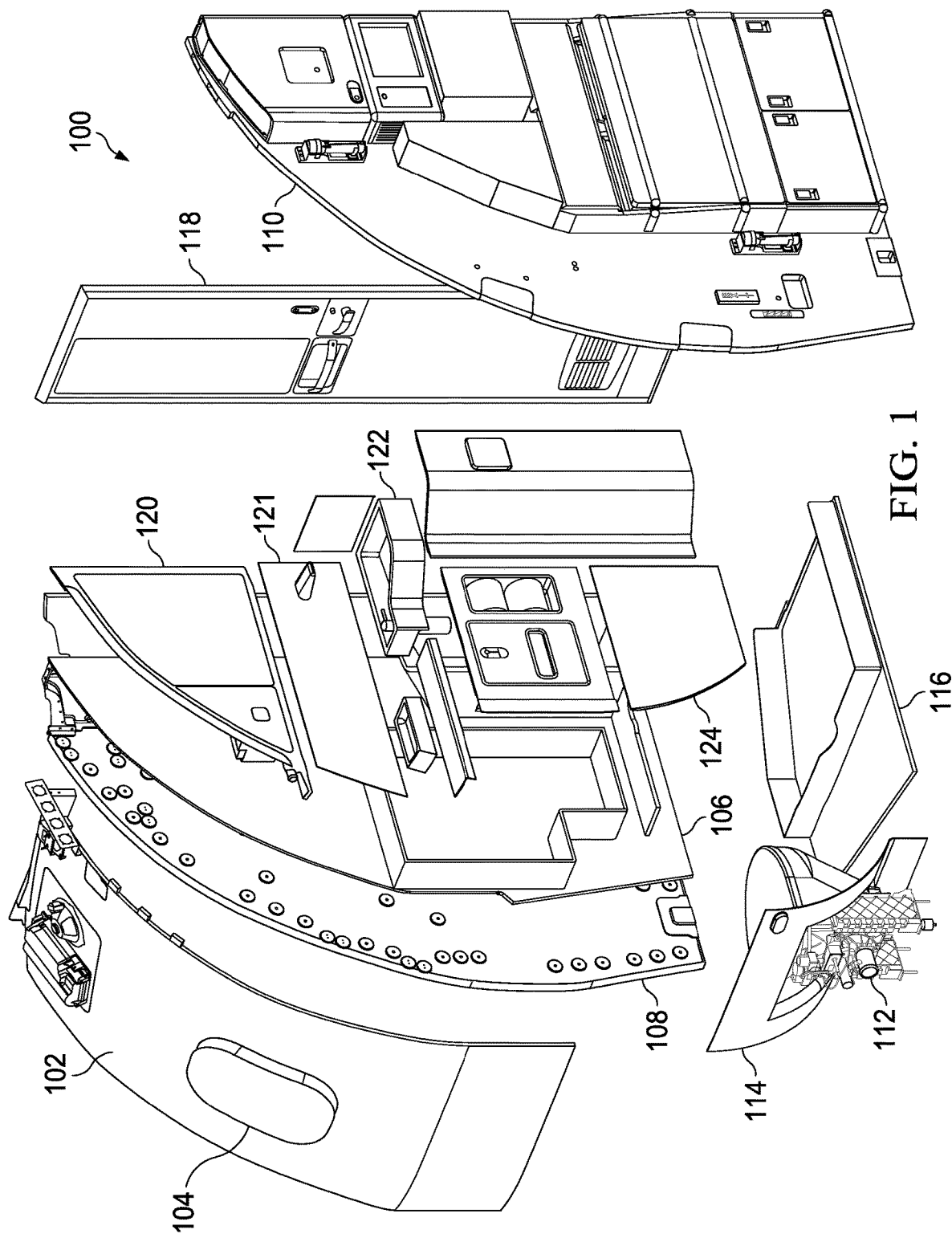
FIG. 1 is an illustration of an exploded view of an aircraft modular lavatory monument in accordance with an illustrative embodiment.

The different illustrative embodiments recognize and take into account a number of different considerations. For example, the illustrative embodiments recognize and take into account that, due to the heavy regulatory environment of aircraft, aircraft lavatory monuments are not modular. In other words, while the monument itself is replaceable, the components and parts inside the lavatory are not.

In an effort to support customers with increasing demand for customization and features, the illustrative embodiments provide for an aircraft lavatory monument design was developed with the intention of providing additional feature selections, which would allow customers to differentiate their brands and provide increased levels of service. To accomplish the goal of allowing maximum customization with minimal engineering impact, a modular design system was developed. The modular nature of the concept allows multiple sub-assemblies to be removed and replaced without impacting the surrounding assemblies.

This modularity is achieved, while maintaining the requirements of a heavy regulatory environment, by creating common interface points on each sub assembly that are not allowed to change throughout the different modular packages offered. Additionally, the design is carefully laid out such that each component has an acceptable removal envelope, and optimized to reduce the quantity and accessibility of fasteners required.

As used herein, the term "modular" refers to a component which is removably attached to at least one other component or fixture. The term "modular" with respect to a component or fixture automatically contemplates common interface points on the component that are unchangeable with respect to the lavatory monument; that is, the common interface points are not considered "modular."

The terms "removably attached" or "removeable attachment" refer to a component, fixture, or connection that is easily or quickly replaceable either by hand or the use of tools in a manner that is considered "easy" or "fast" by one of ordinary skill in the art. The terms "easy" or "fast" are determined relative to components that are fixedly attached, or stated differently, intended for permanent and unchanged attachment or formed monolithically with another part of a component. As used herein, the term "about" or "approximately" when used with respect to measurements is determined by the ordinary artisan and is within acceptable engineering tolerances in the regulatory scheme for a given jurisdiction, such as but not limited to the Federal Aviation Administration Federal Aviation Regulations. The term "fixture" refers to a component that can be replaced as an individual unit, such as but not limited to a sink, a faucet, a cabinet, an alcove panel shaped to present an alcove inside the lavatory monument, a toilet paper holder, a drawer, a liquid hose line, a soap dispenser, a soap holder, a towel dispenser, a towel holder, a drawer, a backsplash, a waste receptacle, a counter top, a light strip, a light bulb, a lightable sign, a mirror, a display device, a speaker, a crew signal button, a switch, a panel, a cup holder, an airsick bag dispenser, a tissue dispenser, a sanitary napkin dispenser, a cologne rack, and a shelf.

The illustrative embodiments recognize and take into account that rework of an aircraft lavatory is also undesirably costly. The illustrative embodiments recognize and take into account that rework of an aircraft lavatory requires disassembly of large sections of the aircraft lavatory. The illustrative embodiments recognize and take into account that rework or repairs run into the physical problems of disassembling the lavatory and accessing the damaged areas.

The illustrative examples further recognize that in conventional aircraft lavatories, it is much more difficult to change a design for an object than to replace the object that is damaged. For example, changing the shape of a countertop or a sink type may be undesirably difficult due to the regulatory reasons above.

The illustrative embodiments recognize and take into account that to build conventional aircraft lavatory monuments, an aft wall would be bonded with a tab and slot joint. The illustrative embodiments recognize and take into account that once bonded, the aft wall cannot be removed from the tab and slot joint. The illustrative embodiments recognize and take into account that it is undesirable to have visible fasteners within the passenger cabin of an aircraft.

Turning now to FIG. 1, an exploded view of an aircraft modular lavatory monument is depicted in accordance with an illustrative embodiment. Aircraft modular lavatory monument 100, as indicated above, is provided with common interface points on each sub assembly (the plurality of removably attached lavatory fixtures) that are not allowed to change throughout the different modular packages offered. Thus, common interface points on each of the plurality of lavatory fixtures are unchangeable with respect to the lavatory monument. Additionally, the design is laid out such that each component (the plurality of removably attached lavatory fixtures) has an acceptable removal envelope, and optimized to reduce the quantity of and increase the accessibility of fasteners required.

Aircraft modular lavatory monument 100 includes modular outboard wall 102 which is intended for removeable attachment to a fuselage of an aircraft. Thus, modular outboard wall 102 may be considered part of a frame for aircraft modular lavatory monument 100. Optionally, aircraft modular lavatory monument 100 may be provided with window 104, which is placed, sized, and dimensioned to match a window in the corresponding model of aircraft for which aircraft modular lavatory monument 100 is intended.

Aircraft modular lavatory monument 100 also includes modular shell wall 106, which also forms part of the frame for aircraft modular lavatory monument 100. Optionally, ballistic intrusion barrier 108 may also be provided, if desirable. In a still further option, modular shell wall 106 may be replaced by ballistic intrusion barrier 108, in which case ballistic intrusion barrier 108 is "modular". In either case, the corresponding wall or barrier is removably attached to modular outboard wall 102 and radiates inwardly towards a central axis of the fuselage of the aircraft. While shown as radiating at a perpendicular angle to modular outboard wall 102, the angle shown may be varied in different illustrative embodiments.

Aircraft modular lavatory monument 100 also includes modular aft wall 110. The term "aft" is used herein merely to distinguish modular shell wall 106 from modular aft wall 110. Modular aft wall 110 also forms part of the frame of aircraft modular lavatory monument 100. While the typical aircraft modular lavatory monument will have modular aft wall 110 actually facing the aft portion of an aircraft, this arrangement is not necessary for all illustrative embodiments. For example, the components shown on modular aft wall 110 could face the "forward" portion of the aircraft, at which point modular aft wall 110 becomes a "modular forward wall". Note, also, that the various sub-components or fixtures shown on either modular shell wall 106 or modular aft wall 110 may be re-arranged, reversed with respect to which side of the wall to which they are attached, or otherwise altered with more or fewer sub-components or fixtures.

Aircraft modular lavatory monument 100 also includes modular toilet 112, modular toilet shroud 114 attached to modular toilet 112, and modular floor pan 116 to which modular toilet 112 is also attached. Modular toilet 112 is attached to a waste disposal system contained in the fuselage of the aircraft. Optionally, a bidet may be provided inside or next to modular toilet 112. In the latter case, the bidet may have a bidet shroud similar to modular toilet shroud 114 shown in FIG. 1.

Aircraft modular lavatory monument 100 also includes modular door 118. Modular door 118 may be a folding door, a slab door, a hinged door, a pocket door, or any other desirable door design. Modular door 118 is removably connected to one or both of modular shell wall 106 or modular aft wall 110.

Aircraft modular lavatory monument 100 also includes modular upper cabinet system 120. Modular upper cabinet system 120 is one or more modular cabinets, drawers, mirrors or other fixtures which are attached at or about chest height or higher for an average adult female or male (or possibly a child in some illustrative embodiments).

Aircraft modular lavatory monument 100 also includes backsplash assembly 121. Backsplash assembly 121 is independently removably attached to modular shell wall 106 relative to the other components of aircraft modular lavatory monument 100.

Aircraft modular lavatory monument 100 also includes modular counter system 122. Modular counter system 122 is one or more modular sinks, backsplashes, waste receptacle openings, soap holders, soap dispensers, towel dispensers, or other fixtures that are about between about waist and chest height for an average adult female or male (or possibly a child in some illustrative embodiments).

Aircraft modular lavatory monument 100 also includes lower cabinet assembly 124. Lower cabinet assembly 124 is one or more modular cabinets, toilet paper dispensers, doors, drawers, tissue dispensers, waste receptacles, or other fixtures that are about between about waist and chest height for an average adult female or male (or possibly a child in some illustrative embodiments). In some illustrative examples, lower cabinet assembly 124, may be referred to as a modular lower cabinet assembly.

The various modular components and fixtures shown in FIG. 1 may be varied. More or fewer fixtures or walls may be present. The arrangement, type, and style of fixtures or wall may be varied. Additional details regarding some of these variations are described below with respect to FIG. 2 through FIG. 25.

Figure 2:
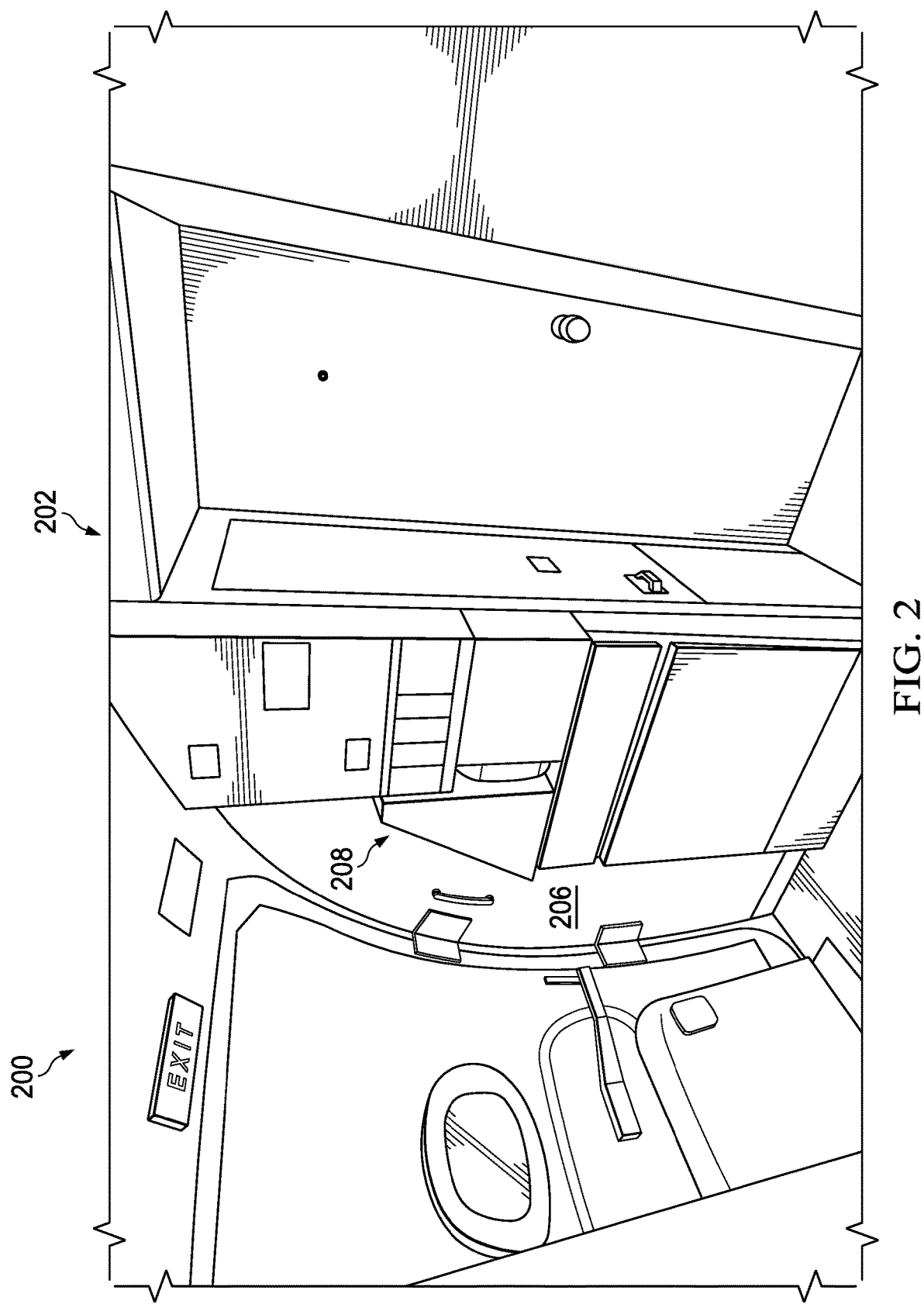
FIG. 2 is an illustration of a view of a lavatory monument of an aircraft upon entering the aircraft in accordance with an illustrative embodiment.

Turning now to FIG. 2, an illustration of a view of a lavatory monument of an aircraft upon entering the aircraft is depicted in accordance with an illustrative embodiment. Lavatory monument 200 may be an example of aircraft modular lavatory monument 100 as assembled in an aircraft. Upon entering aircraft 202, aft wall 204 is visible to passengers. Aft wall 204 may be the same as modular aft wall 110 of FIG. 1.

External side 206 of aft wall 204 is visible to passengers upon entering aircraft 202. External side 206 of aft wall 204 has plurality of non-lavatory features 208. Unchangeable connection points to join aft wall 204 to lavatory monument 200 are not visible to passengers entering aircraft 202.

Figure 3:
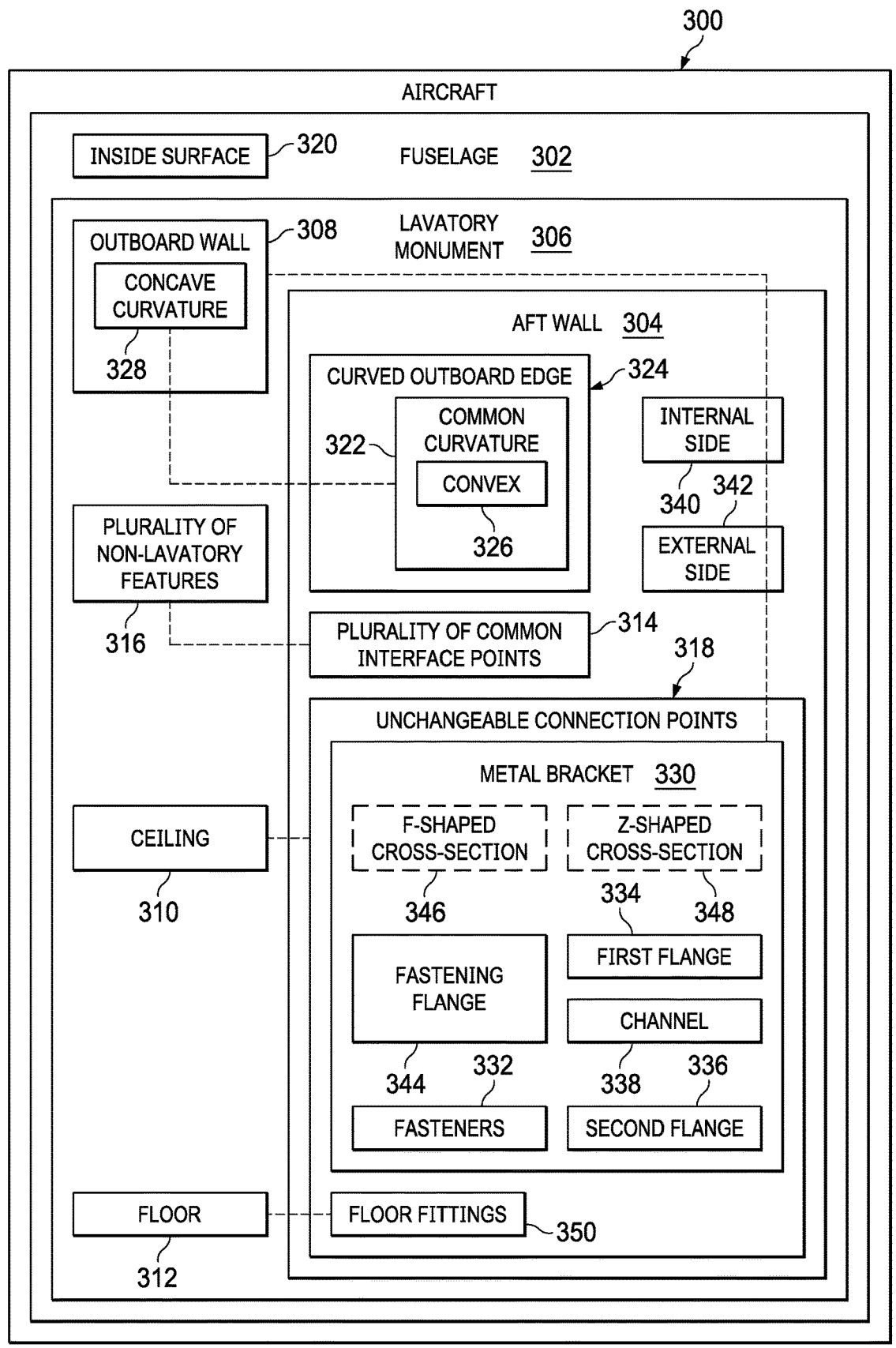
FIG. 3 is an illustration of a block diagram of a lavatory monument within an aircraft in accordance with an illustrative embodiment.

Turning now to FIG. 3, an illustration of a block diagram of a lavatory monument within an aircraft is depicted in accordance with an illustrative embodiment. Aircraft 300 comprises fuselage 302 and aft wall 304 of lavatory monument 306 within fuselage. Aircraft 202 of FIG. 2 may be a physical implementation of aircraft 300. Modular aft wall 110 of FIG. 1 and aft wall 204 of FIG. 2 are physical implementations of aft wall 304. Aft wall 304 extends radially inward toward fuselage.

Aft wall 304 is removably connected to outboard wall 308, ceiling 310, and floor 312 of lavatory monument 306. Aft wall 304 has plurality of common interface points 314 for joining plurality of non-lavatory features 316 to aft wall 304. Aft wall 304 is subject to aircraft regulatory requirements.

Plurality of common interface points 314 enable removal and replacement of any of plurality of non-lavatory features 316. Plurality of non-lavatory features 316 is replaceable without removing aft wall 304. Each of plurality of non-lavatory features 316 is interchangeable with other non-lavatory features having a respective set of common interface points of plurality of common interface points 314.

Plurality of common interface points 314 takes any desirable form. In some illustrative examples, plurality of common interface points 314 comprises fasteners with threaded holes in aft wall 304. In other illustrative examples, plurality of common interface points 314 comprises fasteners with threaded shafts extending outwardly from external side 342 of aft wall 304.

Aircraft 300 further comprises plurality of non-lavatory features 316. In some illustrative examples, plurality of non-lavatory features 316 comprise at least one of an attendant seat, cabinetry, a display screen, or a user interface. Each of plurality of non-lavatory features 316 is replaceable without removing aft wall 304. Each of plurality of non-lavatory features 316 is removeable due to the connections between plurality of non-lavatory features 316 and aft wall 304.

In some illustrative examples, non-lavatory features of plurality of non-lavatory features 316 are grouped into modules. Modules are groupings of non-lavatory features of plurality of non-lavatory features 316 that may be removed and replaced as a whole. For example, a module containing more than one non-lavatory feature of plurality of non-lavatory features 316 is removed and replaced as a whole. In one non-limiting example, multiple cabinets form a cabinetry module of non-lavatory features. In this example, the cabinetry module may be removed and replaced as a whole. Any desirable type of non-lavatory features and any desirable quantity of non-lavatory features may be grouped into a module.

By having plurality of common interface points 314, plurality of non-lavatory features 316 is removable and replaceable. Plurality of common interface points 314 enables replacement of any of plurality of non-lavatory features 316 without redesigning aft wall 304. Plurality of common interface points 314 enables replacement of any of plurality of non-lavatory features 316 without removing aft wall 304. Any of plurality of non-lavatory features 316 may be removed and replaced due to maintenance or reconfiguration of services to be provided. For example, a storage cabinet of plurality of non-lavatory features 316 may be removed and replaced with a different type of non-lavatory feature, such as a touch screen, a storage shelf, a foldable diaper changer, or any other type of non-lavatory feature. As another example, a storage cabinet of plurality of non-lavatory features 316 may be removed and replaced with a same design of storage cabinet as part of maintenance of aircraft 300.

Aft wall 304 has unchangeable connection points 318 configured to join the aft wall 304 to outboard wall 308, ceiling 310, and floor 312 of the lavatory monument 306. Unchangeable connection points 318 are the same for all designs of aft wall 304. Unchangeable connection points 318 are not allowed to change throughout the different modular packages offered for aft wall 304. Unchangeable connection points 318 are common to various designs of aft wall 304 such that unchangeable connection points 318 are at a predetermined location and/or have a predetermined size. Unchangeable connection points 318 take the form of any desirable type of connections. Unchangeable connection points 318 have any desirable shape, location, and type. By having unchangeable connection points 318, aft wall 304 may be removed and replaced with another aft wall having unchangeable connection points 318.

Outboard wall 308 is connected to inside surface 320 of fuselage 302. Aft wall 304 is connected to outboard wall 308 by respective connection points of unchangeable connection points 318.

Aft wall 304 has common curvature 322 for curved outboard edge 324 of aft wall 304. Curved outboard edge 324 is convex 326 and mirrors concave curvature 328 of outboard wall 308. For example, curved outboard edge 324 may have a similar radius of curvature as outboard wall 308 such that outboard edge 324 nests within outboard wall 308. Aft wall 304 may be replaced with another aft wall having common curvature 322.

Unchangeable connection points 318 comprise metal bracket 330 bonded to curved outboard edge 324 of aft wall 304. Metal bracket 330 is bonded to curved outboard edge 324 using any desirable type of adhesive material. In some illustrative examples, metal bracket 330 is bonded to curved outboard edge 324 using a two-part epoxy. The adhesive material used to bond metal bracket 330 to curved outboard edge 324 is selected to provide a desired strength. The adhesive material used to bond metal bracket 330 to curved outboard edge 324 is selected such that the bond does not undesirably degrade or undesirably affect the material of aft wall 304.

In some illustrative examples, unchangeable connection points 318 comprises more than one metal bracket bonded to curved outboard edge 324. In some illustrative examples, metal bracket 330 joins aft wall 304 to ceiling 310. In some illustrative examples, metal bracket 330 joins aft wall 304 to outboard wall 308.

As depicted, unchangeable connection points 318 include fasteners 332 joining metal bracket 330 to outboard wall 308. Fasteners 332 are not visible to a passenger outside of lavatory monument 306.

Metal bracket 330 comprises first flange 334 and second flange 336 forming channel 338. Curved outboard edge 324 is positioned within channel 338 of metal bracket 330.

First flange 334 of metal bracket 330 contacts internal side 340 of aft wall 304. Internal side 340 faces into lavatory monument 306. Second flange 336 of metal bracket 330 contacts external side 342 of aft wall 304. External side 342 faces into a passenger cabin of aircraft 300 and away from lavatory monument 306.

In some illustrative examples, metal bracket 330 further comprises fastening flange 344. In some illustrative examples, fasteners 332 connect fastening flange 344 of metal bracket 330 to outboard wall 308.

Metal bracket 330 has any desirable cross-sectional shape and any desirable length. Metal bracket 330 is designed to be bonded to curved outboard edge 324 of aft wall 304. In some illustrative examples, metal bracket 330 is designed to be removably connected to outboard wall 308 without being visible to passengers of aircraft 300. In some illustrative examples, metal bracket 330 is designed to be removably connected to ceiling 310 without being visible to passengers of aircraft 300.

In some illustrative examples, metal bracket 330 has F-shaped cross-section 346. In some illustrative examples, F-shaped cross-section 346 is formed when fastening flange 344 is perpendicular to first flange 334 and second flange 336. In some illustrative examples, metal bracket 330 has z-shaped cross-section 348. In some illustrative examples, z-shaped cross-section 348 is formed when fastening flange 344 is parallel to first flange 334 and second flange 336.

Unchangeable connection points 318 comprises floor fittings 350. Floor fittings 350 removably connect aft wall 304 to floor 312. In some illustrative examples, aft wall 304 is removed and replaced with another aft wall having floor fittings 350. Aft wall 304 is configured to be removed without removing lavatory monument 306 from aircraft 300.

By removing aft wall 304 without removing lavatory monument 306, aft wall 304 may be removed for maintenance. For example, by removing aft wall 304 without removing lavatory monument 306, aft wall 304 may be replaced with an aft wall of a same design as aft wall 304 when aft wall 304 is showing wear from normal use. As another example, by removing aft wall 304 without removing lavatory monument 306, aft wall 304 may be replaced with an aft wall having a different design. For example, aft wall 304 may be removed and replaced with an aft wall without plurality of common interface points 314. In one illustrative example, aft wall 304 is removed and replaced with an aft wall with a decorative surface without plurality of common interface points 314.

The illustration of aft wall 304 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, aft wall 304 may not have plurality of common interface points 314. In some illustrative examples, aft wall 304 has a decorative surface, not depicted in FIG. 3. In some illustrative examples, the decorative surface may be installed using plurality of common interface points 314. In some illustrative examples, plurality of common interface points 314 are not present and decorative surface is present on aft wall 304. In some illustrative examples, the decorative surface takes the form of a decorative laminate or any other aesthetically desirable surface.

As another example, one of first flange 334 and second flange 336 may be optional. In some illustrative examples, second flange 336 is not present, for example, in z-shaped cross-section 348. As yet another example, although not depicted, metal bracket 330 may have an h-shaped cross-section.

Figure 4:
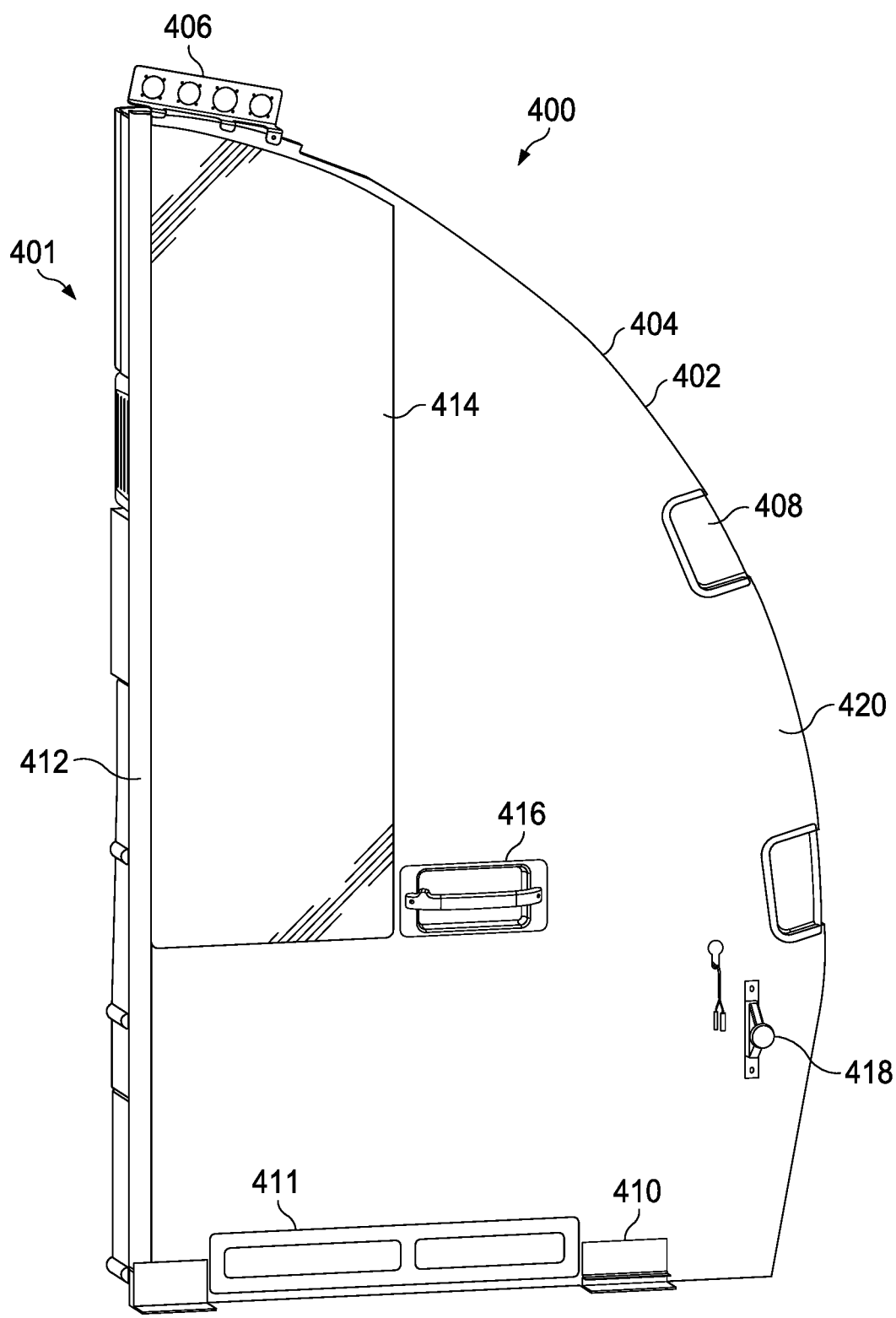
FIG. 4 is an illustration of an interior side of an aft wall in accordance with an illustrative embodiment.

Turning now to FIG. 4, an illustration of an interior side of an aft wall is depicted in accordance with an illustrative embodiment. Aft wall 400 is a physical implementation of aft wall 304 of FIG. 3. Aft wall 400 may be modular aft wall 110 of FIG. 1.

As depicted, aft wall 400 is an implementation of an aft wall adjacent an aircraft entry door. Aft wall 400 may be the same as aft wall 204 of FIG. 2. View 401 of aft wall 400 is an interior view within a lavatory, such as aircraft modular lavatory monument 100 of FIG. 1. Aft wall 400 has common curvature 402 for curved outboard edge 404 of aft wall 400. Curved outboard edge 404 is convex and mirrors a concave curvature of an outboard wall (not depicted).

Aft wall 400 has a plurality of unchangeable connection points. In view 401, the plurality of unchangeable connection points comprises metal bracket 406 bonded to curved outboard edge 404 of aft wall 400.

Aft wall 400 comprises aircraft door flaps 408. Aircraft door flaps 408 in aft wall 400 allow aircraft door snubbers (not depicted) to pass through aft wall 400 when the aircraft entry door (not depicted) is opened.

The plurality of unchangeable connection points comprises floor fittings 410 on base 411 of aft wall 400. Inboard edge 412 of aft wall 400 interfaces with a door for a lavatory monument.

Aft wall 400 also includes mirror 414 and assist handle 416. As illustrated, assist handle 416 includes a bag hook on one side. Aft wall 400 also includes routing 418 for door heat grille providing heated air. Each of mirror 414 and assist handle 416 are on internal side 420 of aft wall 400. When installed in an aircraft, internal side 420 faces into a lavatory monument.

Figure 5:
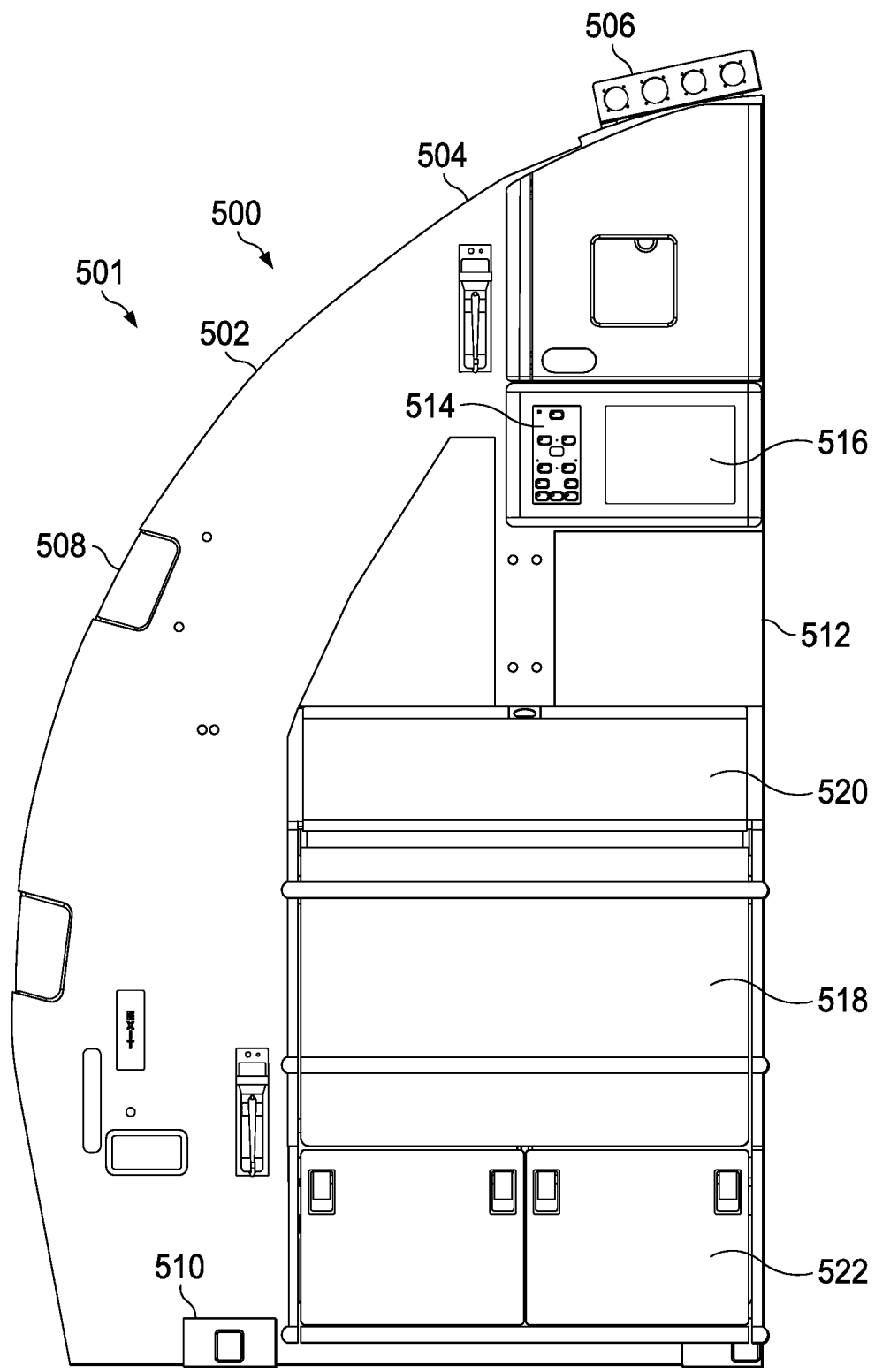
FIG. 5 is an illustration of an external side of an aft wall in accordance with an illustrative embodiment.

Turning now to FIG. 5, an illustration of an external side of an aft wall is depicted in accordance with an illustrative embodiment. Aft wall 500 is a physical implementation of aft wall 304 of FIG. 3. Aft wall 500 may be modular aft wall 110 of FIG. 1.

As depicted, aft wall 500 is an implementation of an aft wall adjacent an aircraft entry door. Aft wall 500 may be the same as aft wall 204 of FIG. 2.

As depicted, aft wall 500 is an implementation of an aft wall of a lavatory that is adjacent to an aircraft entry door. View 501 of aft wall 500 is a view of aft wall 500 outside of a lavatory, such as aircraft modular lavatory monument 100 of FIG. 1. For example, aft wall 500 may be an implementation of an external side of aft wall 400 of FIG. 4. External side 524 of aft wall 500 is the side of aft wall 500 visible to passengers upon entering an aircraft, such as aircraft 2800 of FIG. 28.

Aft wall 500 has common curvature 502 for curved outboard edge 504 of aft wall 500. Curved outboard edge 504 is convex and mirrors a concave curvature of an outboard wall (not depicted).

Aft wall 500 has a plurality of unchangeable connection points. In view 501, the plurality of unchangeable connection points comprises metal bracket 506 bonded to curved outboard edge 504 of aft wall 500.

Aft wall 500 comprises aircraft door flaps 508. Aircraft door flaps 508 in aft wall 500 allow aircraft door snubbers (not depicted) to pass through aft wall 500 when the aircraft entry door (not depicted) is opened.

The plurality of unchangeable connection points comprises floor fittings 510 on base 511 of aft wall 500. Inboard edge 512 of aft wall 500 interfaces with a door for a lavatory monument.

Aft wall 500 comprises plurality of non-lavatory features 513. Plurality of non-lavatory features 513 comprises cabinetry as well as display screen 514, user interface 516, foldable attendant seat 518, foldable diaper changing table 520, and storage 522.

In some illustrative embodiments, aft wall 500 is provisioned for a large number of interfaces, including attendant seats, such as foldable attendant seat 518. It is desirable for aft walls, such as aft wall 500, to be designed in terms of shape and materials to hold high loads due to attendant seats and other equipment interfaces. Conventional attendant seat plug and sleeve inserts would undesirably be seen from the inside of the lavatory. In some illustrative examples, aft wall 500 has imbedded foam kits and metal details to deal with wire pass throughs and attendant seat mounting.

It is also desirable for an aircraft electrical umbilical to route through aft wall 500. In some illustrative examples, wiring clamshells (not depicted) are provided in aft wall 500. In some illustrative examples, aft wall 500 is provided with the aircraft electrical umbilical interface for the lavatory. In some illustrative examples, the aft wall is provided with an environmental control system (ECS) routing for a door heat grille.

Each component of plurality of non-lavatory features 513 of aft wall 500 of FIG. 5 is removeable and replaceable. Each component of plurality of non-lavatory features 513 is connected to aft wall 500 using a plurality of common interface points.

In some illustrative examples, non-lavatory features of plurality of non-lavatory features 513 are grouped into modules. Modules are groupings of non-lavatory features of plurality of non-lavatory features 513 that may be removed and replaced as a whole. For example, a module containing more than one non-lavatory feature of plurality of non-lavatory features 513 is removed and replaced as a whole. In one non-limiting example, multiple cabinets form a cabinetry module of non-lavatory features. In this example, the cabinetry module may be removed and replaced as a whole. Any desirable type of non-lavatory features and any desirable quantity of non-lavatory features may be grouped into a module.

Other options, styles, and arrangements are also possible. The illustrative examples shown in FIGS. 4 and 5 are not meant to imply physical or architectural limitations to the manner in which an illustrative embodiment may be implemented.

Figure 6:
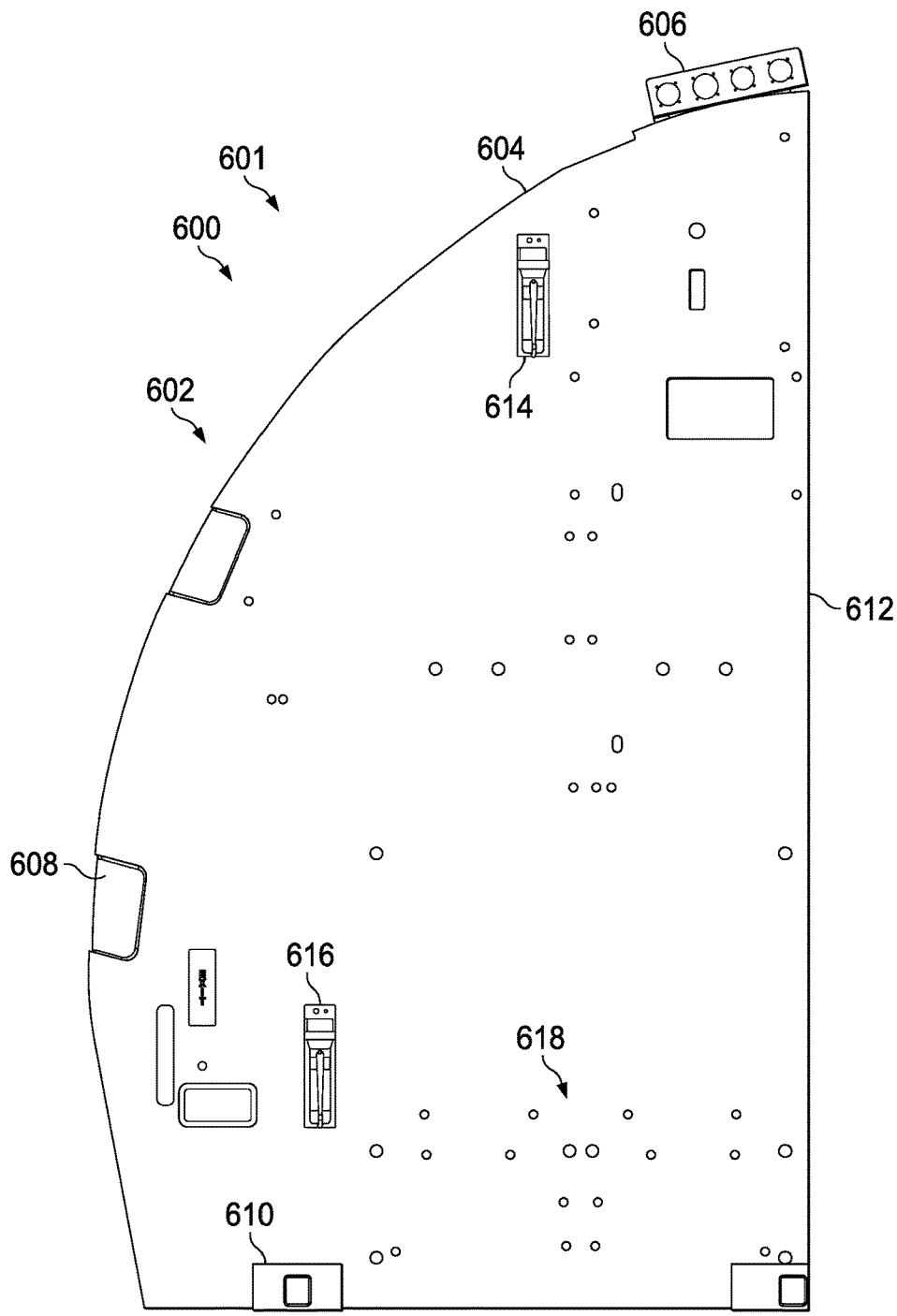
FIG. 6 is an illustration of an external side of an aft wall without non-lavatory features attached in accordance with an illustrative embodiment.

Turning now to FIG. 6, an illustration of an external side of an aft wall without non-lavatory features attached is depicted in accordance with an illustrative embodiment. Aft wall 600 is a physical implementation of aft wall 304 of FIG. 3. Aft wall 600 may be modular aft wall 110 of FIG. 1 without any non-lavatory features. As depicted, aft wall 600 is an implementation of an aft wall adjacent an aircraft entry door. Aft wall 600 may be the same as aft wall 204 of FIG. 2.

Aft wall 600 may be an implementation of an external side of aft wall 400 of FIG. 4. View 601 of aft wall 600 is the side of aft wall 600 visible to passengers upon entering an aircraft, such as aircraft 2800 of FIG. 28.

Aft wall 600 has common curvature 602 for curved outboard edge 604 of aft wall 600. Curved outboard edge 604 is convex and mirrors a concave curvature of an outboard wall (not depicted).

Aft wall 600 has a plurality of unchangeable connection points. In view 601, the plurality of unchangeable connection points comprises metal bracket 606 bonded to curved outboard edge 604 of aft wall 600.

Aft wall 600 comprises aircraft door flaps 608. Aircraft door flaps 608 in aft wall 600 allow aircraft door snubbers (not depicted) to pass through aft wall 600 when the aircraft entry door (not depicted) is opened.

The plurality of unchangeable connection points comprises floor fittings 610 on base 611 of aft wall 600. Inboard edge 612 of aft wall 600 interfaces with a door for a lavatory monument.

As depicted, plurality of common interface points 618 is visible on external side 614 of aft wall 600. Plurality of common interface points 618 is present on external side 614 of aft wall 600 to connect a plurality of non-lavatory features to external side 614 of aft wall 600. As depicted, plurality of common interface points 618 comprises fasteners with threaded holes in aft wall 600.

Figure 7:
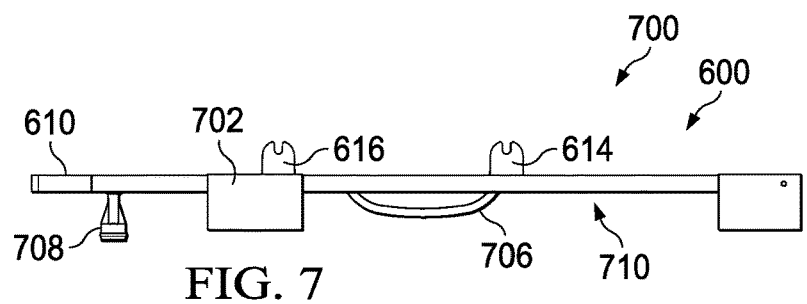
FIG. 7 is an illustration of a bottom edge of an aft wall configured to be joined to a floor of a lavatory monument in accordance with an illustrative embodiment.

Turning now to FIG. 7, an illustration of a bottom edge of an aft wall configured to be joined to a floor of a lavatory monument is depicted in accordance with an illustrative embodiment. View 700 is a bottom view of aft wall 600 of FIG. 6. In view 700, floor fitting 702 and floor fitting 704 are visible. Floor fitting 702 and floor fitting 704 are unchangeable connection points to removably connect aft wall 600 to a floor.

Aft wall 600 also comprises assist handle 706 and routing 708 on internal side 710 of aft wall 600.

Turning now to FIG. 8, an illustration of an inboard edge of an aft wall configured to be joined to a modular door of a lavatory monument is depicted in accordance with an illustrative embodiment. View 800 is a view of inboard edge 612 of aft wall 600 of FIGS. 6-7. Inboard edge 612 is configured to be joined to a door assembly of a lavatory monument.

Turning now to FIG. 9, an illustration of a top view of a curved outboard edge of an aft wall configured to be joined to an outboard wall of a lavatory monument is depicted in accordance with an illustrative embodiment. View 900 is a top view of aft wall 600 of FIGS. 6-8. In view 900, bracket 606 is visible. Bracket 606 is configured to join aft wall 600 to an outboard wall (not depicted).

Figure 10:
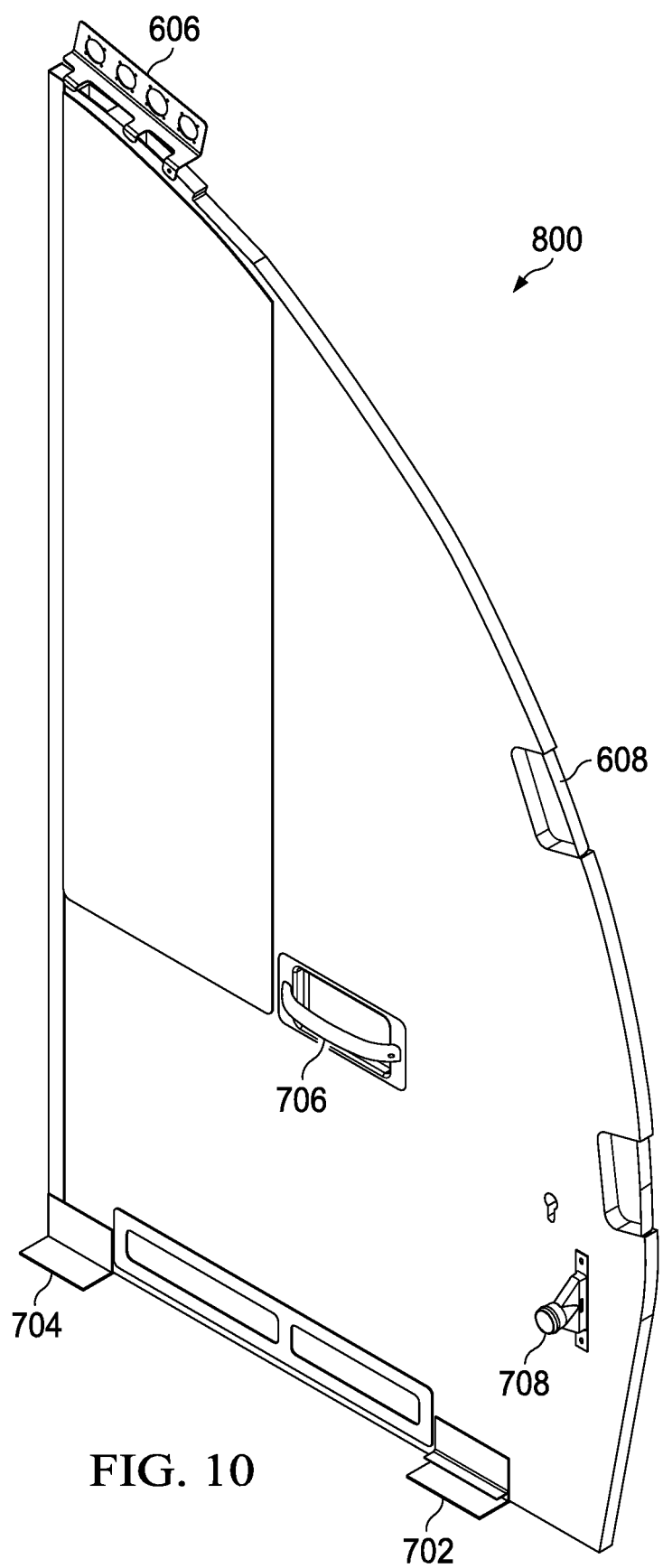
FIG. 10 is an illustration of a side view of a metal bracket bonded to a curved outboard edge of an aft wall configured to be joined to an outboard wall of a lavatory monument in accordance with an illustrative embodiment.

Turning now to FIG. 10, an illustration of a side view of a metal bracket bonded to a curved outboard edge of an aft wall configured to be joined to an outboard wall of a lavatory monument is depicted in accordance with an illustrative embodiment. View 1000 is a view of curved outboard edge 604 of aft wall 600 of FIGS. 6-9.

Although not depicted in view 1000, in some illustrative examples, more than one bracket connects aft wall 600 to an outboard wall. In some illustrative examples, another bracket in addition to bracket 606 is bonded to curved outboard edge 604 of aft wall 600. For example, another bracket may be bonded to curved outboard edge 604 at location 1002. As another example, another bracket may be bonded to curved outboard edge 604 at location 1004.

Turning now to FIG. 11, an illustration of a cross-sectional view of a metal bracket bonded to a curved outboard edge of an aft wall configured to be joined to an outboard wall of a lavatory monument is depicted in accordance with an illustrative embodiment. View 1100 is a cross-sectional view of bracket 606 bonded to curved outboard edge 604.

In cross-sectional view 1100 of bracket 606, first flange 1102 is visible. First flange 1102 is in contact with internal side 710 of aft wall 600. Fastening flange 1104 extends upward from aft wall 600.

The illustrative examples provide an ornamental design for a metal bracket for an aft wall of an aircraft lavatory monument. Each of FIGS. 12-15 provide views of the metal bracket of this design.

Turning now to FIG. 12, an illustration of a perspective view of a front of a metal bracket is depicted in accordance with an illustrative embodiment. FIG. 12 is a front view of a metal bracket showing a new design. Metal bracket 1200 is a physical implementation of metal bracket 330 of FIG. 3. Metal bracket 1200 has first flange 1202 and fastening flange 1204. As depicted, metal bracket 1200 has z-shaped cross-section 1206.

As depicted, first flange 1202 is not continuous across the length of metal bracket 1200. For example, first flange 1202 has portion 1208, 1210, and 1212. Metal bracket 1200 in FIG. 12 is not meant to imply physical or architectural limitations to the manner in which an illustrative embodiment may be implemented. In other implementations, first flange 1202 may be continuous along the length of metal bracket 1200. In some illustrative examples, first flange 1202 has greater than three portions. In other illustrative examples, first flange 1202 has fewer than three portions.

Figure 13:
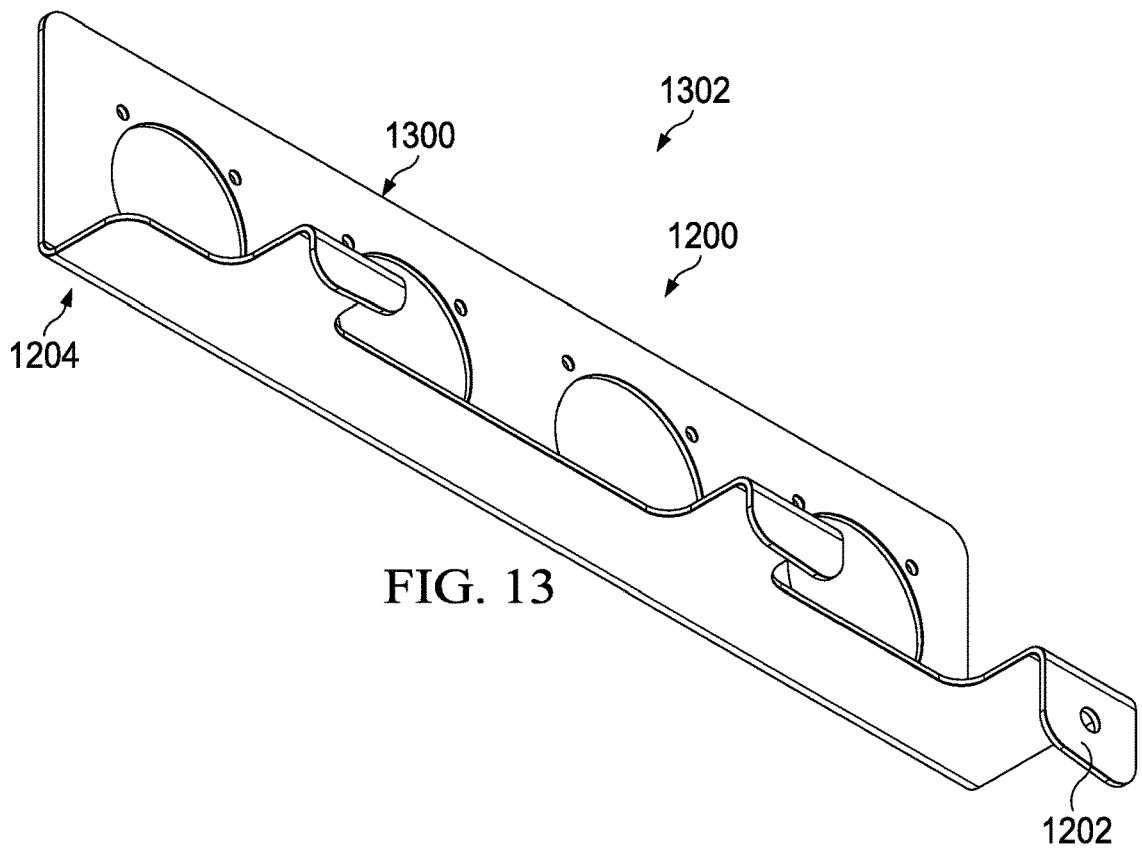
FIG. 13 is an illustration of a side view of a metal bracket in accordance with an illustrative embodiment.

Turning now to FIG. 13, an illustration of a side view of a metal bracket is depicted in accordance with an illustrative embodiment. FIG. 13 is a side view of the metal bracket. Holes 1300 of fastening flange 1204 are visible in view 1302. To fasten metal bracket 1200 to a ceiling within an aircraft, fasteners (not depicted) are sent through holes 1300.

Figure 14:
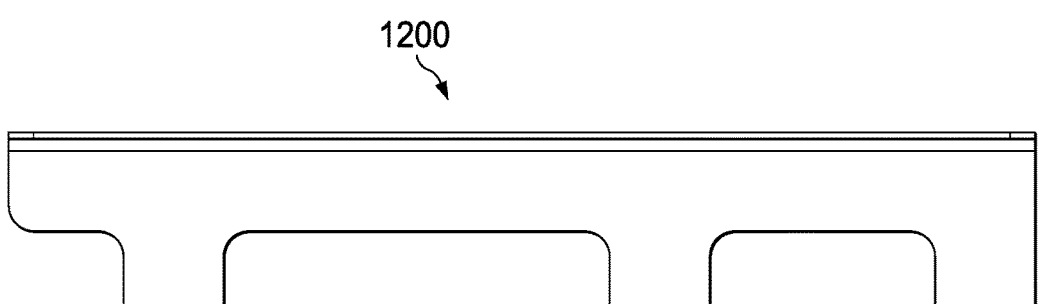
FIG. 14 is an illustration of a top view of a metal bracket in accordance with an illustrative embodiment.

Turning now to FIG. 14, an illustration of a top view of a metal bracket is depicted in accordance with an illustrative embodiment. FIG. 14 is a top view of the metal bracket.

Figure 15:
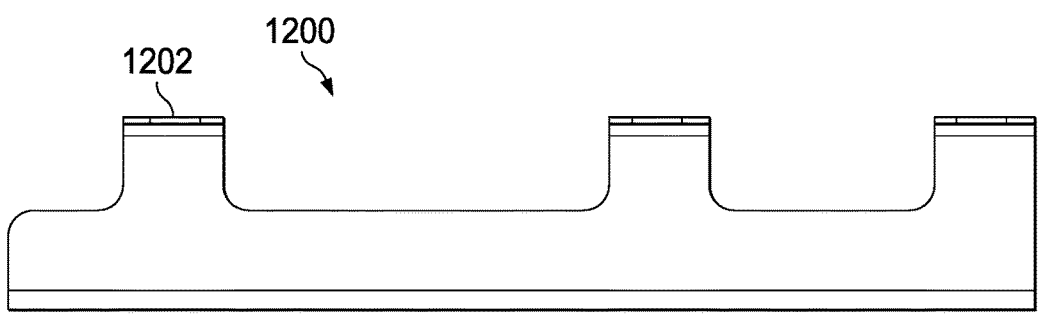
FIG. 15 is an illustration of a bottom view of a metal bracket in accordance with an illustrative embodiment.

Turning now to FIG. 15, an illustration of a bottom view of a metal bracket is depicted in accordance with an illustrative embodiment. FIG. 15 is a bottom view of the metal bracket. In view 1500, channel 1206 formed by first flange 1202 and second flange 1204 is visible.

Figure 16:
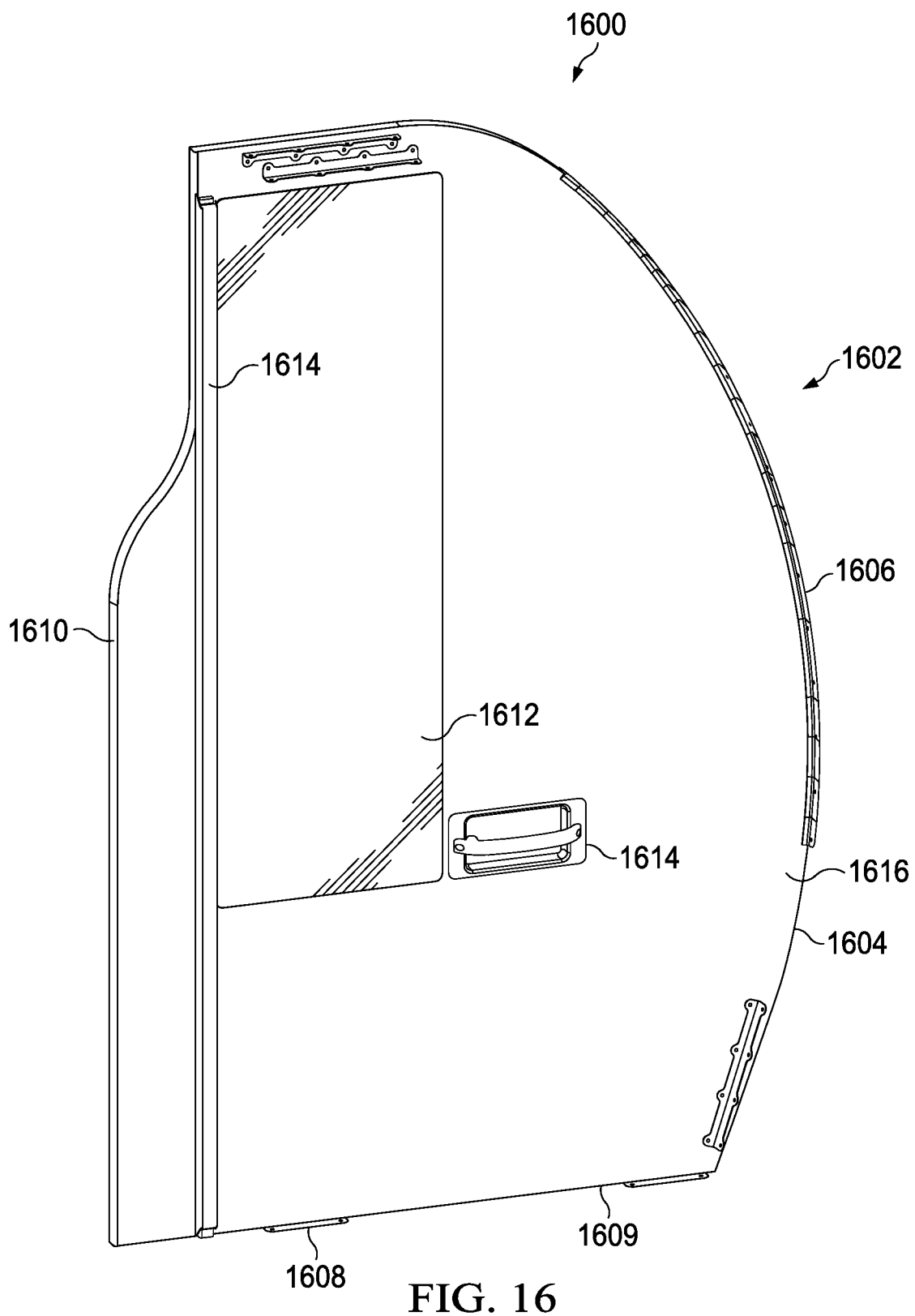
FIG. 16 is an illustration of an interior side of an aft wall in accordance with an illustrative embodiment.

Turning now to FIG. 16, an illustration of an interior side of an aft wall is depicted in accordance with an illustrative embodiment. Aft wall 1600 is a physical implementation of aft wall 304 of FIG. 3. View 1601 of aft wall 1600 is an interior view within a lavatory. As depicted, aft wall 1600 is an implementation of an aft wall that is not adjacent an aircraft entry door. For example, aft wall 1600 may be within a lavatory in the center or the rear of the cabin of an aircraft, such as aircraft 2800 of FIG. 28.

View 1601 of aft wall 1600 is an interior view within a lavatory, such as aircraft modular lavatory monument 100 of FIG. 1. Aft wall 1600 has common curvature 1602 for curved outboard edge 1604 of aft wall 1600. Curved outboard edge 1604 is convex and mirrors a concave curvature of an outboard wall (not depicted).

Aft wall 1600 has a plurality of unchangeable connection points. In view 1601, the plurality of unchangeable connection points comprises metal bracket 1606 bonded to curved outboard edge 1604 of aft wall 1600. Metal bracket 1606 is used to connect aft wall 1600 to an outboard wall (not depicted).

The plurality of unchangeable connection points comprises floor fittings 1608 on base 1609 of aft wall 1600. Inboard edge 1610 of aft wall 1600 has a decorative component to provide privacy within a passenger cabin of an aircraft.

Aft wall 1600 also includes mirror 1612 and door strike 1614. Each of mirror 1612 and door frame 1614 are on internal side 1616 of aft wall 1600. When installed in an aircraft, internal side 1616 faces into a lavatory monument.

Figure 17:
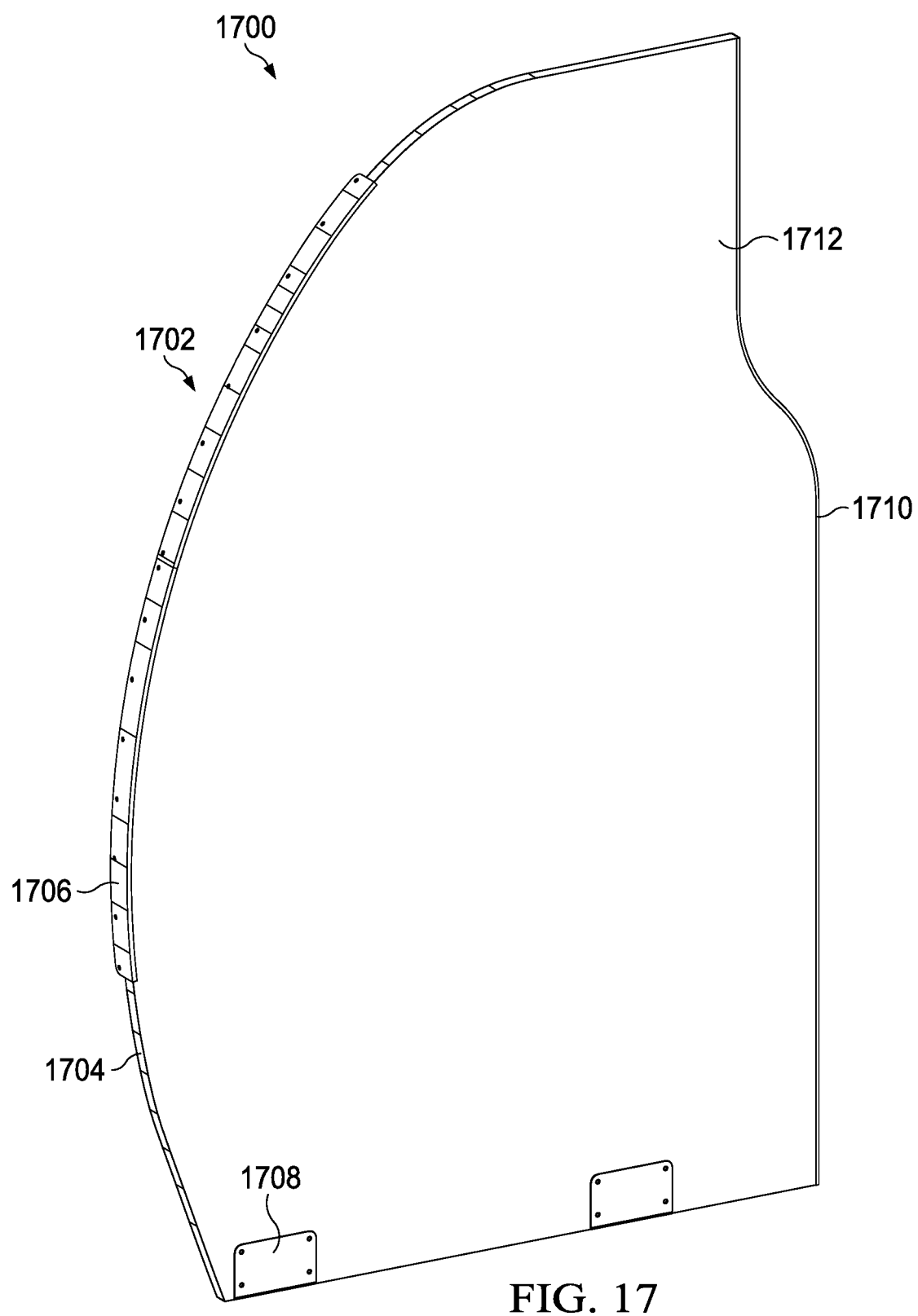
FIG. 17 is an illustration of an external side of an aft wall in accordance with an illustrative embodiment.

Turning now to FIG. 17, an illustration of an external side of an aft wall is depicted in accordance with an illustrative embodiment. Aft wall 1700 is a physical implementation of aft wall 304 of FIG. 3. As depicted, aft wall 1700 is an implementation of an aft wall that is not adjacent an aircraft entry door. For example, aft wall 1700 may be within a lavatory in the center or the rear of the cabin of an aircraft, such as aircraft 2800 of FIG. 28.

As depicted, aft wall 1700 is an implementation of an aft wall of a lavatory that is not adjacent to an aircraft entry door. View 1701 of aft wall 1700 is a view of aft wall 1700 outside of a lavatory. For example, aft wall 1700 may be an implementation of an external side of aft wall 1600 of FIG. 16. External side 1712 of aft wall 1700 is the side of aft wall 1700 visible to passengers upon entering an aircraft, such as aircraft 2800 of FIG. 28.

Aft wall 1700 has common curvature 1702 for curved outboard edge 1704 of aft wall 1700. Curved outboard edge 1704 is convex and mirrors a concave curvature of an outboard wall (not depicted).

Aft wall 1700 has a plurality of unchangeable connection points. In view 1701, the plurality of unchangeable connection points comprises metal bracket 1706 bonded to curved outboard edge 1704 of aft wall 1700.

The plurality of unchangeable connection points comprises floor fittings 1708 on base 1709 of aft wall 1700. Inboard edge 1710 of aft wall 1700 has a decorative component to provide privacy within a passenger cabin of an aircraft.

For simplicity, a plurality of common interface points is not depicted on external side 1712 of aft wall 1700. However, a plurality of common interface points would be present on external side 1712 of aft wall 1700 to connect a plurality of non-lavatory features to external side 1712 of aft wall 1700.

In some illustrative embodiments, aft wall 1700 is provisioned for a large number of interfaces, including attendant seats. It is desirable for aft walls, such as aft wall 1700, to be designed in terms of shape and materials to hold high loads due to attendant seats and other equipment interfaces. In some illustrative examples, aft wall 1700 has imbedded foam kits and metal details to deal with wire pass throughs and attendant seat mounting.

Each component of the plurality of non-lavatory features connected to aft wall 1700 of FIG. 17 are removeable and replaceable due to a plurality of common interface points. Each component connected to aft wall is connected using the plurality of common interface points.

Figures 18, 19:
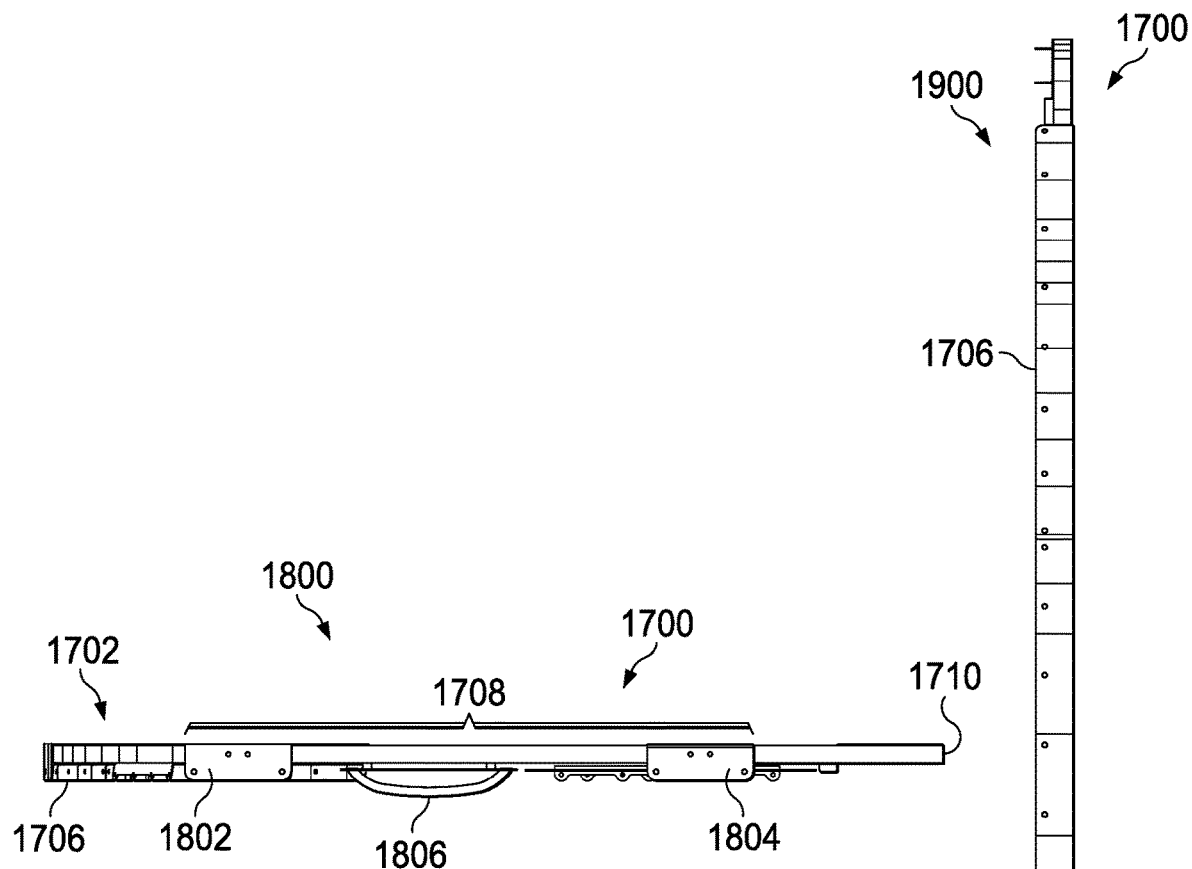
FIG. 18 is an illustration of a bottom edge of an aft wall configured to be joined to a floor of a lavatory monument in accordance with an illustrative embodiment.
FIG. 19 is an illustration of a side view of a metal bracket bonded to a curved outboard edge of an aft wall configured to be joined to an outboard wall of a lavatory monument in accordance with an illustrative embodiment.

Turning now to FIG. 18, an illustration of a bottom edge of an aft wall configured to be joined to a floor of a lavatory monument is depicted in accordance with an illustrative embodiment. View 1800 is a bottom view of aft wall 1700 of FIG. 17. In view 1800, floor fitting 1802 and floor fitting 1804 of floor fittings 1708 are visible. Floor fitting 1802 and floor fitting 1804 are unchangeable connection points to removably connect aft wall 1700 to a floor. Aft wall 1700 also comprises assist handle 1806 on internal side 1808 of aft wall 1700. In view 1800, metal bracket 1706 bonded to curved outboard edge 1704 of aft wall 1700 is visible.

Turning now to FIG. 19, an illustration of a side view of a metal bracket bonded to a curved outboard edge of an aft wall configured to be joined to an outboard wall of a lavatory monument is depicted in accordance with an illustrative embodiment. View 1900 is a view of curved outboard edge 1704 of aft wall 1700 of FIGS. 17-18. Metal bracket 1706 is bonded to curved outboard edge 1704 and covers a substantial portion of curved outboard edge 1704.

Figure 20:
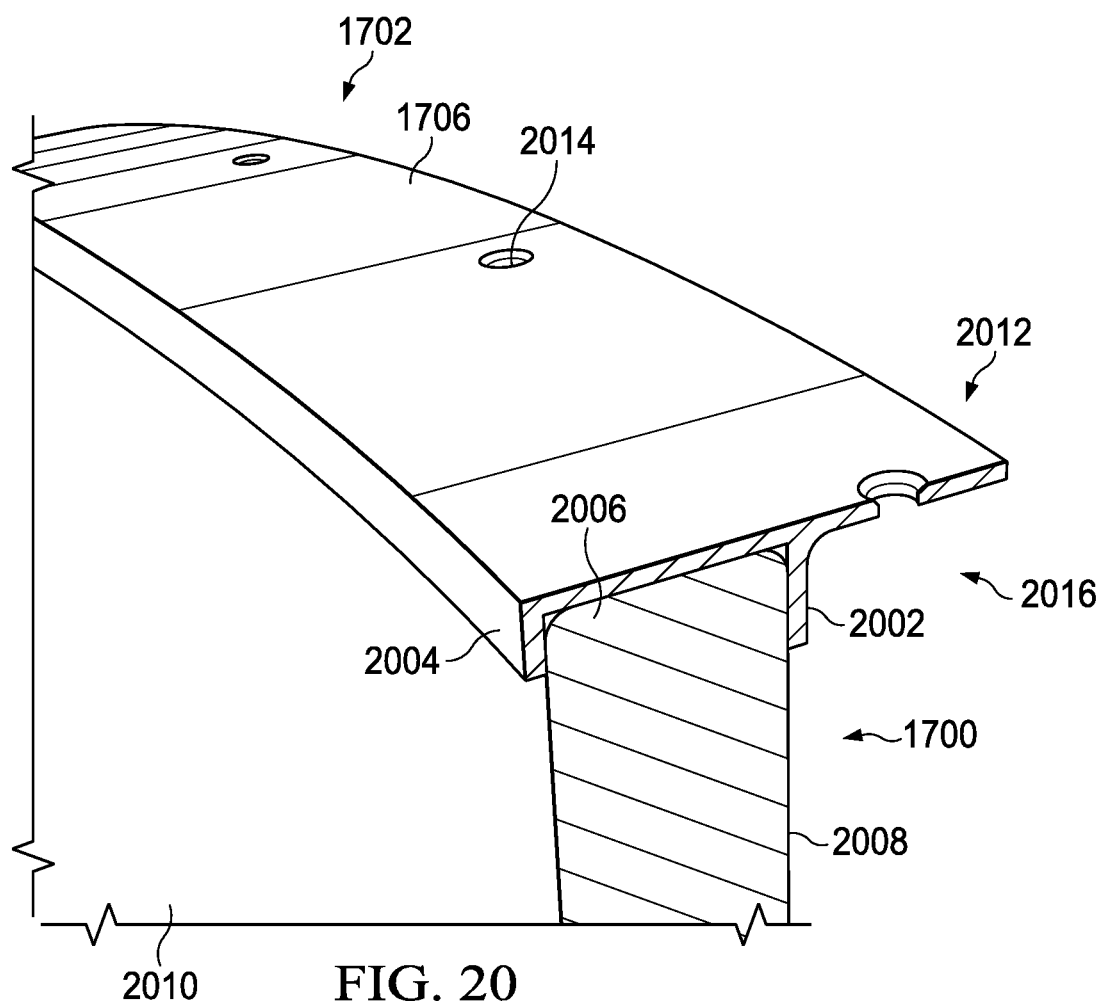
FIG. 20 is an illustration of a cross-sectional view of a metal bracket bonded to a curved outboard edge of an aft wall configured to be joined to an outboard wall of a lavatory monument in accordance with an illustrative embodiment.

Turning now to FIG. 20, an illustration of a cross-sectional view of a metal bracket bonded to a curved outboard edge of an aft wall configured to be joined to an outboard wall of a lavatory monument is depicted in accordance with an illustrative embodiment. View 2000 is a cross-sectional view of metal bracket 1706 bonded to curved outboard edge 1704 of aft wall 1700.

Metal bracket 1706 has first flange 2002 and second flange 2004 forming channel 2006. First flange 2002 contacts internal side 2008 of aft wall 1700. Second flange 2004 contacts external side 2010 of aft wall 1700.

Metal bracket 1706 has fastening flange 2012. Fastening flange 2012 is perpendicular to first flange 2002 and second flange 2004. Fastening flange 2012 has holes 2014. To connect aft wall 1700 to an outboard wall (not depicted), fasteners (not depicted) are sent through fastening flange 2012. As depicted, metal bracket 1706 has F-shaped cross-section 2016.

The illustrative examples provide an ornamental design for a metal bracket for an aft wall of an aircraft lavatory monument. Each of FIGS. 21-24 provide views of the metal bracket of this design.

Figure 21:
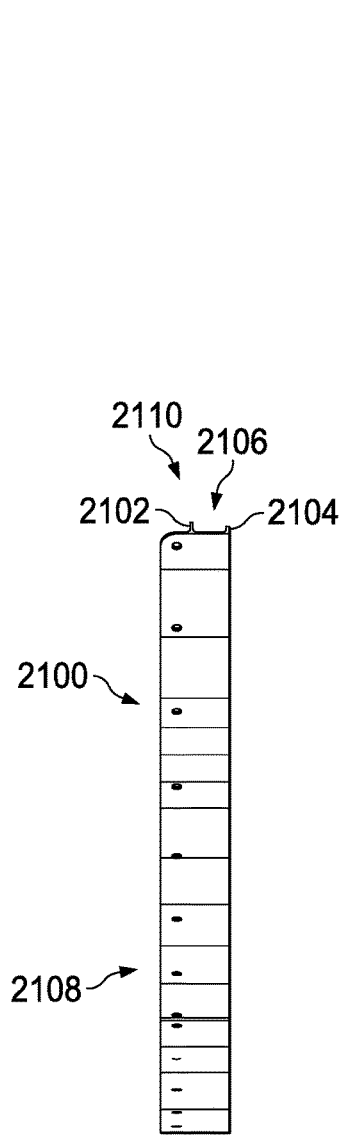
FIG. 21 is an illustration of a perspective view of a front of a metal bracket in accordance with an illustrative embodiment.

Turning now to FIG. 21, an illustration of a perspective view of a front of a metal bracket is depicted in accordance with an illustrative embodiment. FIG. 21 is a front view of a metal bracket showing a new design. Metal bracket 2100 is a physical implementation of metal bracket 330 of FIG. 3. Metal bracket 2100 has first flange 2102 and second flange 2104 forming channel 2106. Metal bracket 2100 also has fastening flange 2108. As depicted, metal bracket 2100 has F-shaped cross-section 2110.

Figure 22:
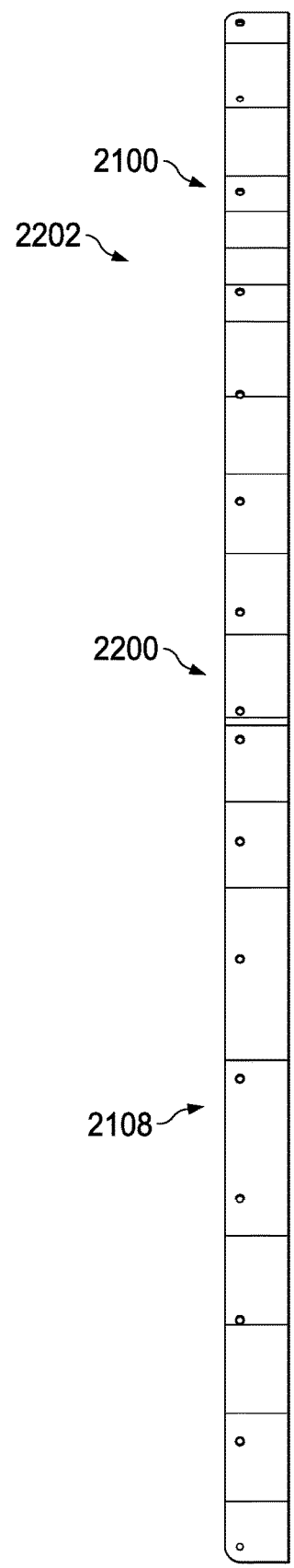
FIG. 22 is an illustration of a top view of a metal bracket in accordance with an illustrative embodiment.

Turning now to FIG. 22, an illustration of a top view of a metal bracket is depicted in accordance with an illustrative embodiment. FIG. 22 is a top view of the metal bracket. FIG. 22 is a top view of the metal bracket. Holes 2200 of fastening flange 2108 are visible in view 2202. To fasten metal bracket 2100 to an outboard wall within an aircraft, fasteners (not depicted) are sent through holes 2200.

Figure 23:
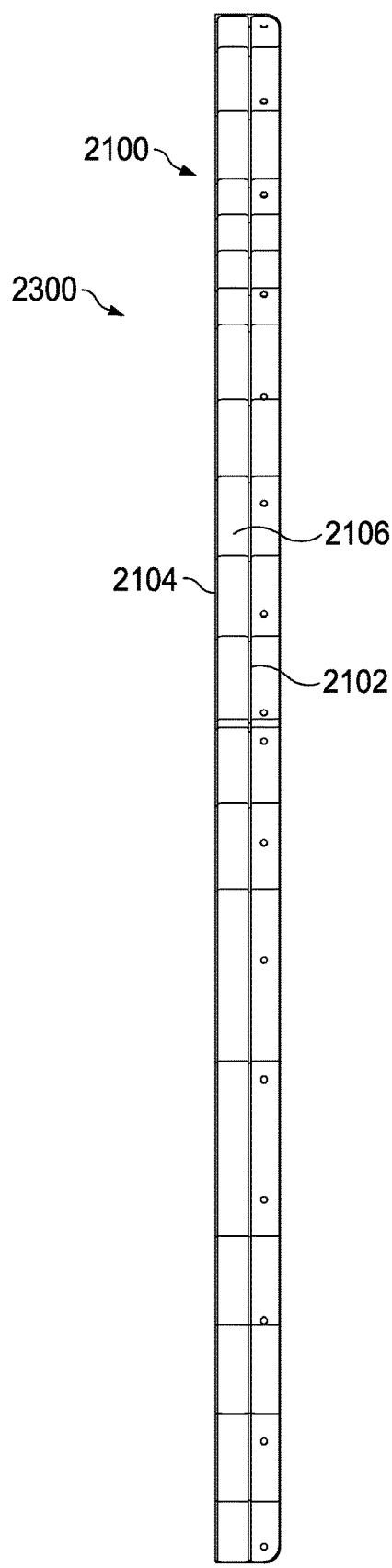
FIG. 23 is an illustration of a bottom view of a metal bracket in accordance with an illustrative embodiment.

Turning now to FIG. 23, an illustration of a bottom view of a metal bracket is depicted in accordance with an illustrative embodiment. FIG. 23 is a bottom view of the metal bracket. In view 2300, channel 2106 formed by first flange 2102 and second flange 2104 is visible.

Figure 24:
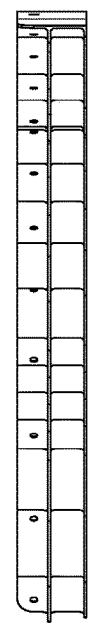
FIG. 24 is an illustration of a back view of a metal bracket in accordance with an illustrative embodiment.

Turning now to FIG. 24, an illustration of a back view of a metal bracket is depicted in accordance with an illustrative embodiment. FIG. 24 is a back view of the metal bracket.

Other options, styles, and arrangements are also possible. The illustrative examples shown in FIGS. 4 and 24 are not meant to imply physical or architectural limitations to the manner in which an illustrative embodiment may be implemented.

Figure 25:
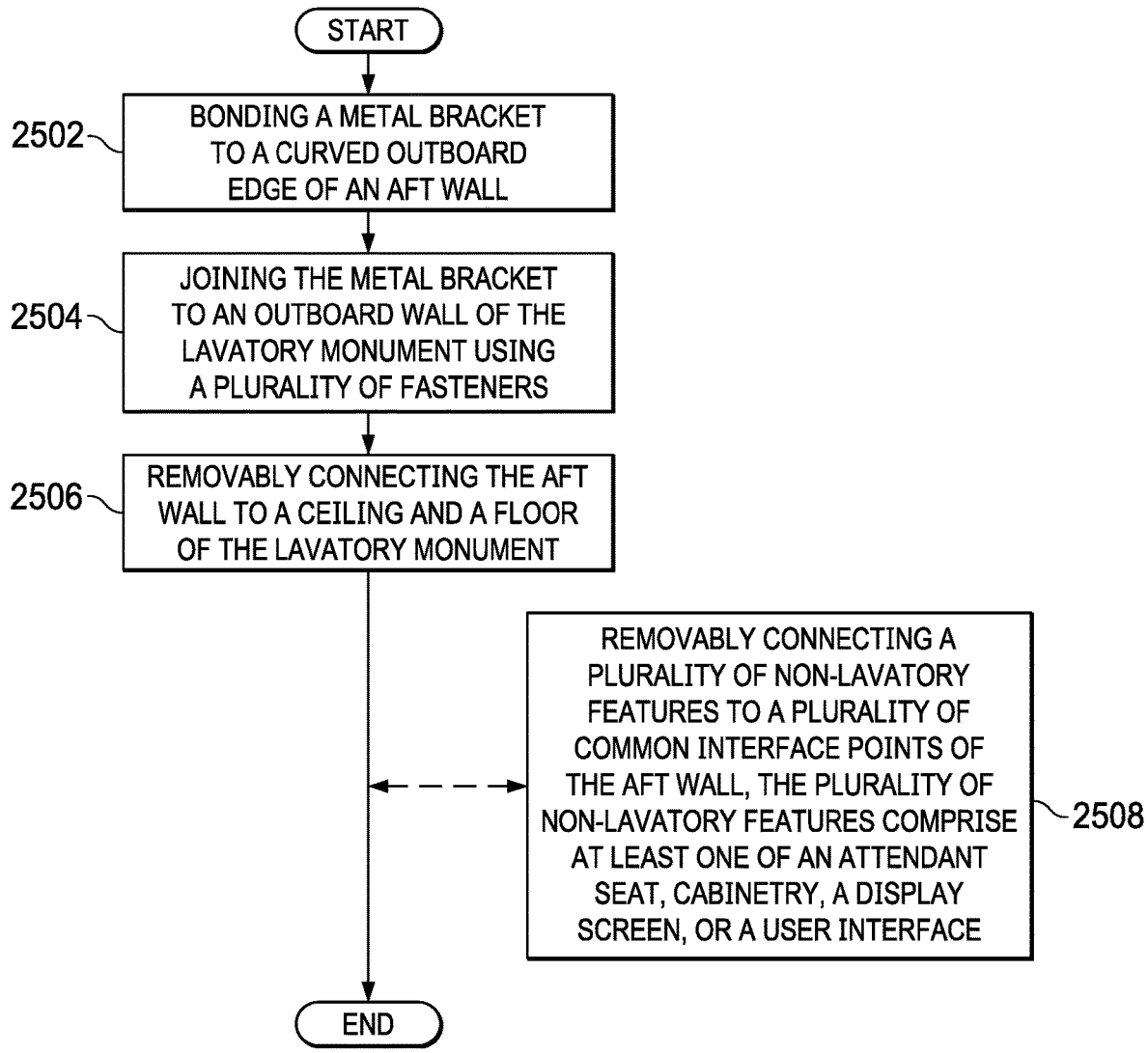
FIG. 25 is a flowchart of a method for constructing a lavatory monument in an aircraft, the lavatory monument having interchangeable sub-assemblies in accordance with an illustrative embodiment.

Turning now to FIG. 25, a flowchart of a method for constructing a lavatory monument in an aircraft, the lavatory monument having interchangeable sub-assemblies, is presented in accordance with an illustrative embodiment. Method 2500 may be implemented in an aircraft, such as aircraft 300 of FIG. 3 and aircraft 2800 of FIG. 28. Method 2500 may be used to install any of aft wall 400 of FIG. 4, aft wall 500 of FIG. 5, aft wall 600 of FIG. 6, aft wall 1600 of FIG. 16, or aft wall 1700 of FIG. 17 in an aircraft.

The interchangeable sub-assemblies of the lavatory monument include at least one of any desirable lavatory fixtures, or any desirable non-lavatory features, or modules comprising any combination of at least one of lavatory fixtures or non-lavatory features. The lavatory monument comprises a plurality of sub-assemblies that are removably connected to a given lavatory fixture such that removal and replacement of one of the plurality of sub-assemblies does not require removal of any other of the plurality of sub-assemblies. In one illustrative example, a sub-assembly comprises a backsplash, a faucet, and a liquid hose line. In this illustrative example, the sub-assembly may be installed and removed from the lavatory without removing any other sub-assemblies.

Method 2500 bonds a metal bracket to a curved outboard edge of an aft wall (operation 2502). Method 2500 joins the metal bracket to an outboard wall of the lavatory monument using a plurality of fasteners (operation 2504). Method 2500 removably connects the aft wall to a ceiling and a floor of the lavatory monument (operation 2506). Afterwards, method 2500 terminates.

In some illustrative examples, method 2500 removably connects a plurality of non-lavatory features to a plurality of common interface points of the aft wall, the plurality of non-lavatory features comprises at least one of an attendant seat, cabinetry, a display screen, or a user interface (operation 2508). The plurality of non-lavatory features may be removed and replaced. In some illustrative examples, a non-lavatory feature may be removed to install a different non-lavatory feature having a different design. In some illustrative examples, a non-lavatory feature is removed for replacement during maintenance.

Figure 26:
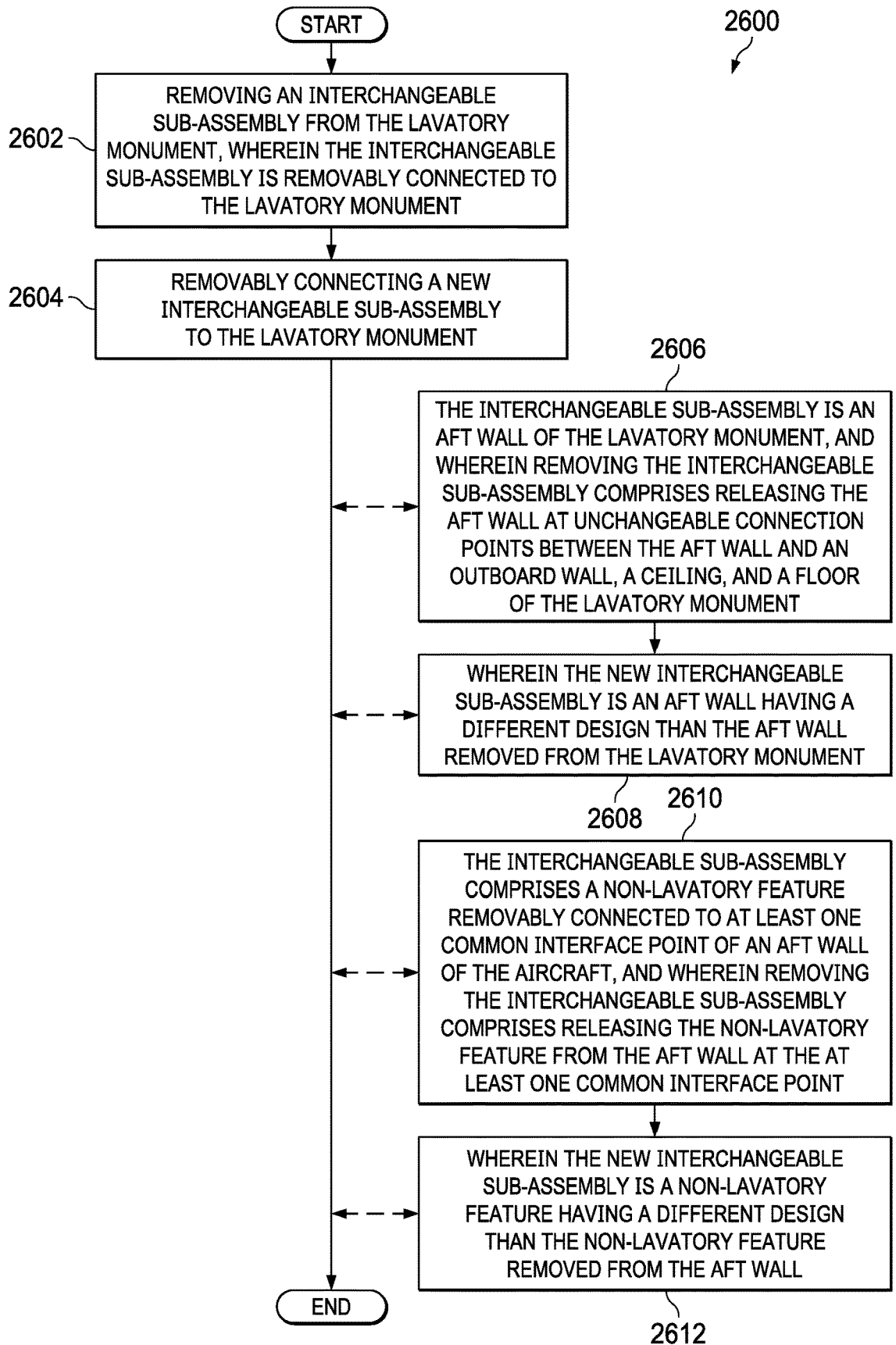
FIG. 26 is a flowchart of a method for of performing maintenance on a lavatory monument in an aircraft, the lavatory monument having interchangeable sub-assemblies in accordance with an illustrative embodiment.

Turning now to FIG. 26, a flowchart of a method for of performing maintenance on a lavatory monument in an aircraft, the lavatory monument having interchangeable sub-assemblies is presented in accordance with an illustrative embodiment. Method 2600 may be implemented in an aircraft, such as aircraft 300 of FIG. 3 and aircraft 2800 of FIG. 28. Method 2600 may be used to remove any of aft wall 400 of FIG. 4, aft wall 500 of FIG. 5, aft wall 600 of FIG. 6, aft wall 1600 of FIG. 16, or aft wall 1700 of FIG. 17 in an aircraft.

Methods 2600 removes an interchangeable sub-assembly from the lavatory monument, wherein the interchangeable sub-assembly is removably connected to the lavatory monument (operation 2602). Method 2600 removably connects a new interchangeable sub-assembly to the lavatory monument (operation 2604). Afterwards, method 2600 terminates.

In some illustrative examples, the interchangeable sub-assembly is an aft wall of the lavatory monument, and wherein removing the interchangeable sub-assembly comprises releasing the aft wall at unchangeable connection points between the aft wall and an outboard wall, a ceiling, and a floor of the lavatory monument (operation 2606). In some illustrative examples, the new interchangeable sub-assembly is an aft wall having a different design than the aft wall removed from the lavatory monument (operation 2608). By having a different design, the new aft wall may have different common interface points, different non-lavatory features connected, or any other desirable differences. In some illustrative examples, the new aft wall may have a same design as the removed aft wall. In these illustrative examples, the aft wall is removed for maintenance due to wear and replaced with the new aft wall having the same design.

In some illustrative examples, the interchangeable sub-assembly comprises a non-lavatory feature removably connected to at least one common interface point of an aft wall of the aircraft, and wherein removing the interchangeable sub-assembly comprises releasing the non-lavatory feature from the aft wall at the at least one common interface point (operation 2610). In some illustrative examples, the new interchangeable sub-assembly is a non-lavatory feature having a different design than the non-lavatory feature removed from the aft wall (operation 2612). By having a different design, the new non-lavatory feature may have a different function, a different aesthetic, or any other desirable differences. In some illustrative examples, the new non-lavatory feature may have a same design as the removed non-lavatory feature. In these illustrative examples, the non-lavatory feature is removed for maintenance due to wear and replaced with the new non-lavatory feature having the same design.

Still other variations are possible. More or fewer operations may be present, or different operations may be present. The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. In some illustrative examples, not all blocks are performed and some blocks may be optional, in a flowchart or block diagram. For example, operation 2508 may be optional.

Figure 27:
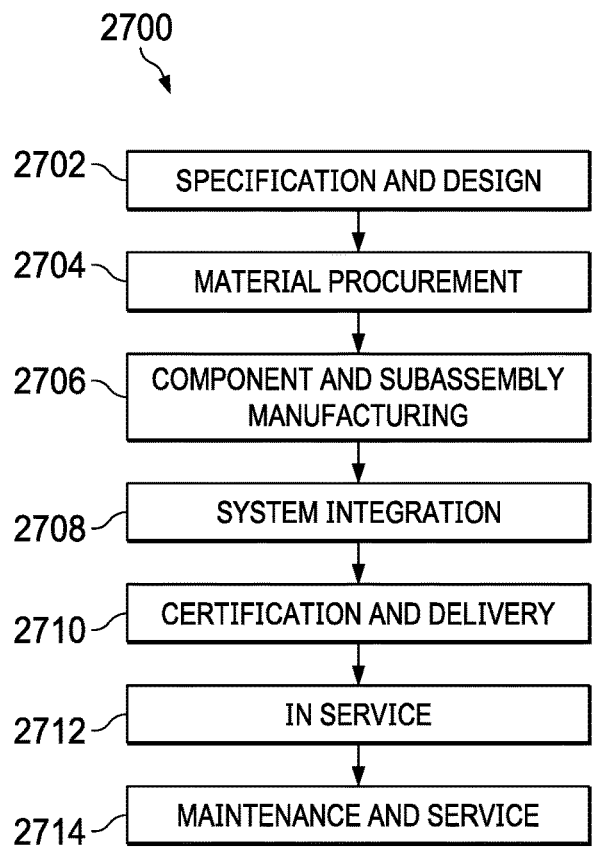
FIG. 27 is an illustration of an aircraft manufacturing and service method in the form of a block diagram in accordance with an illustrative embodiment.
Figure 28:
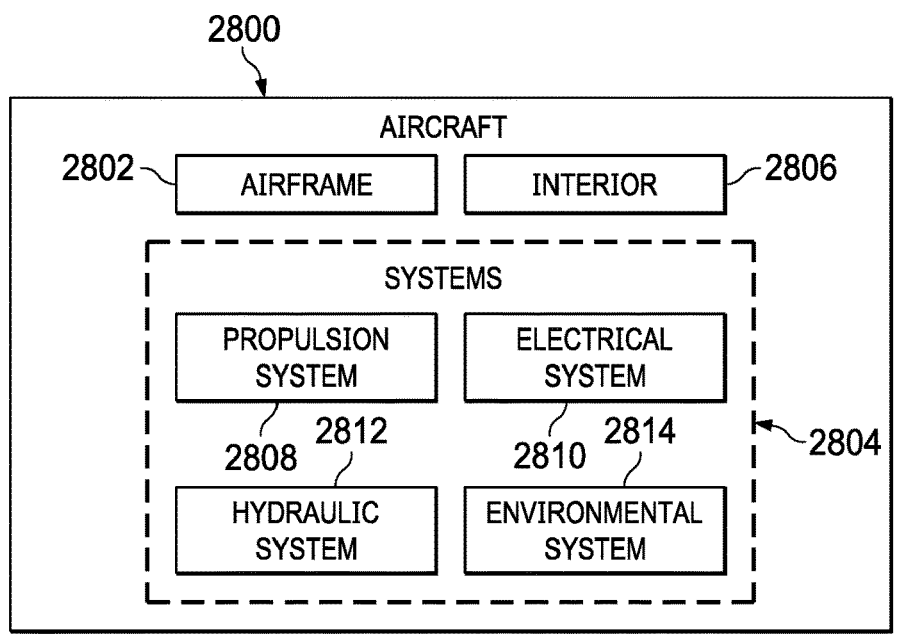
FIG. 28 is an illustration of an aircraft in the form of a block diagram in accordance with an illustrative embodiment.

FIG. 27 is an illustration of an aircraft manufacturing and service method in the form of a block diagram, in accordance with an illustrative embodiment. FIG. 28 is an illustration of an aircraft in the form of a block diagram, in accordance with an illustrative embodiment.

Illustrative embodiments of the disclosure may be described in the context of aircraft manufacturing and service method 2700 as shown in FIG. 27 and aircraft 2800 as shown in FIG. 28. Turning first to FIG. 27, an illustration of an aircraft manufacturing and service method is depicted in accordance with an illustrative embodiment. During preproduction, aircraft manufacturing and service method 2700 may include specification and design 2702 of aircraft 2800 in FIG. 28 and material procurement 2704.

During production, component and subassembly manufacturing 2706 and system integration 2708 of aircraft 2800 in FIG. 28 takes place. Thereafter, aircraft 2800 in FIG. 28 may go through certification and delivery 2710 in order to be placed in service 2712. While in service 2712 by a customer, aircraft 2800 in FIG. 28 is scheduled for routine maintenance and service 2714, which may include modification, reconfiguration, refurbishment, and other maintenance or service.

Each of the processes of aircraft manufacturing and service method 2700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 28, an illustration of an aircraft is depicted in which an illustrative embodiment may be implemented. In this example, aircraft 2800 is produced by aircraft manufacturing and service method 2700 in FIG. 27 and may include airframe 2802 with plurality of systems 2804 and interior 2806. Examples of systems 2804 include one or more of propulsion system 2808, electrical system 2810, hydraulic system 2812, and environmental system 2814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2700 in FIG. 27. One or more apparatus embodiments, method embodiments, or a combination thereof may be utilized during production stages, such as component and subassembly manufacturing 2706 and system integration 2708 in FIG. 27. In one illustrative example, components of an aircraft modular lavatory monument, such as lavatory monument 306, may be produced and assembled in component and subassembly manufacturing 2706 in FIG. 27.

One or more apparatus embodiments, method embodiments, or a combination thereof may be utilized while aircraft 2800 is in service 2712 and/or during maintenance and service 2714 in FIG. 27. For example, one or more non-lavatory features of plurality of non-lavatory features of an aft wall of an aircraft modular lavatory monument, such as aft wall 304 of lavatory monument 306, may be at least one of removed or replaced during maintenance and service 2714 in FIG. 27. The use of a number of the different illustrative embodiments may substantially expedite the assembly of and/or reduce the cost of aircraft 2800.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft that comprises:
a fuselage that comprises therein a lavatory monument that comprises an aft wall configured to be removably connected to an outboard wall of the lavatory monument;
the aft wall comprises:
an outboard edge that curves radially inwardly relative to the fuselage;
a bracket bonded to the curved outboard edge, wherein the bracket covers a portion of the outboard edge; and
fasteners configured to removably connect the bracket to the outboard wall.

2. The aircraft of claim 1, the aft wall has unchangeable connection points configured to join the aft wall to the outboard wall, a ceiling, and a floor of the lavatory monument.

3. The aircraft of claim 2 further comprising:
the outboard wall connected to an inside surface of the fuselage.

4. The aircraft of claim 2, wherein the aft wall has a common curvature for the curved outboard edge of the aft wall, wherein the curved outboard edge is convex and mirrors a concave curvature of the outboard wall.

5. The aircraft of claim 1, wherein the aft wall is configured such that the fasteners are not visible to a passenger outside of the lavatory monument.

6. The aircraft of claim 1, wherein the bracket comprises a first flange and a second flange forming a channel, wherein the curved outboard edge is positioned within the channel of the bracket.

7. The aircraft of claim 5, wherein the first flange of the bracket contacts an internal side of the aft wall, and wherein the second flange of the bracket contacts an external side of the aft wall.

8. The aircraft of claim 1, wherein the aft wall has a plurality of common interface points for joining a plurality of non-lavatory features to the aft wall.

9. The aircraft of claim 8 further comprising:
the plurality of non-lavatory features, wherein the plurality of non-lavatory features comprises at least one of an attendant seat, cabinetry, a display screen, or a user interface.

10. An aft wall installed in an aircraft and configured to be removably connected to an outboard wall of a lavatory monument, such that the aft wall comprises:
a curved outboard edge having a common curvature;
a bracket bonded to the curved outboard edge, wherein the bracket covers a portion of the curved outboard edge; and
fasteners configured to removably connect the bracket to the outboard wall.

11. The aft wall of claim 10, further comprising:
a plurality of common interface points for joining a plurality of non-lavatory features to the aft wall.

12. The aft wall of claim 10, wherein the aft wall has unchangeable connection points configured to join the aft wall to the outboard wall, a ceiling, and a floor of the lavatory monument.

13. The aft wall of claim 10, wherein the curved outboard edge is convex and mirrors a concave curvature of the outboard wall.

14. The aft wall of claim 10, wherein the metal bracket comprises a first flange and a second flange forming a channel, wherein the curved outboard edge is positioned within the channel of the metal bracket.

15. The aft wall of claim 14, wherein the first flange of the bracket contacts an internal side of the aft wall, and wherein the second flange of the bracket contacts an external side of the aft wall.

16. The aft wall of claim 15, wherein the bracket further comprises a fastening flange, wherein the first flange, second flange, and fastening flange form a F-shaped cross-section.

17. The aft wall of claim 10, wherein the bracket has a z-shaped cross-section and comprises:
a first flange in contact with an internal side of the aft wall; and
a fastening flange extending upward from the aft wall and configured to be removably fastened to the outboard wall with the fasteners.

18. A method of constructing a lavatory monument in an aircraft, the lavatory monument having interchangeable sub-assemblies, the method comprising:
bonding a bracket to a curved outboard edge of an aft wall, wherein the bracket covers a portion of the curved outboard edge;
joining the bracket to an outboard wall of the lavatory monument using a plurality of fasteners; and
removably connecting the aft wall to a ceiling and a floor of the lavatory monument.

19. The method of claim 18 further comprising:
removably connecting a plurality of non-lavatory features to a plurality of common interface points of the aft wall, the plurality of non-lavatory features comprises at least one of an attendant seat, cabinetry, a display screen, or a user interface.

20. A method of performing maintenance on a lavatory monument in an aircraft, the lavatory monument having interchangeable sub-assemblies, the method comprising:
removing an interchangeable sub-assembly from the lavatory monument, wherein the interchangeable sub-assembly is removably connected to the lavatory monument; and
removably connecting a new interchangeable sub-assembly to the lavatory monument, wherein the interchangeable sub-assembly is an aft wall of the lavatory monument configured to be removably connected to an outboard wall, a ceiling, and a floor of the lavatory monument and the aft wall comprises:
a curved outboard edge having a common curvature;
a bracket bonded to the curved outboard edge, wherein the bracket covers a less than whole portion of the curved outboard edge; and
fasteners configured to removably connect the bracket to the outboard wall.

21. The method of claim 20, wherein removing the interchangeable sub-assembly comprises releasing the aft wall at unchangeable connection points between the aft wall and the outboard wall, the ceiling, and the floor of the lavatory monument.

22. The method of claim 21, wherein the new interchangeable sub-assembly is an aft wall having a different design than the aft wall removed from the lavatory monument.

23. The method of 20, wherein the interchangeable sub-assembly comprises a non-lavatory feature removably connected to at least one common interface point of the aft wall of the aircraft lavatory monument, and wherein removing the interchangeable sub-assembly comprises releasing the non-lavatory feature from the aft wall of the lavatory monument at the at least one common interface point.

24. The method of claim 23, wherein the new interchangeable sub-assembly is a non-lavatory feature having a different design than the non-lavatory feature removed from the aft wall of the lavatory monument.

* * * * *